United States Patent [19]
Tran et al.

[11] Patent Number: 5,905,881
[45] Date of Patent: May 18, 1999

[54] DELAYED STATE WRITES FOR AN INSTRUCTION PROCESSOR

[75] Inventors: Nguyen T. Tran, Plymouth; John S. Kuslak, Blaine; Lawrence R. Fontaine, Minneapolis; Kenneth L. Engelbrecht, Blaine, all of Minn.

[73] Assignee: Unisys Corporation, Blue Bell, Pa.

[21] Appl. No.: 08/972,985

[22] Filed: Nov. 19, 1997

Related U.S. Application Data

[63] Continuation of application No. 08/564,947, Nov. 30, 1995, abandoned.

[51] Int. Cl.$^6$ .................................................. G06F 9/38
[52] U.S. Cl. .............. 395/395; 364/716.04; 364/726.04; 364/736.05; 364/748.14
[58] Field of Search ...................... 395/552, 376, 395/395; 364/716.04, 726.04, 736.05, 748.14

[56] References Cited

U.S. PATENT DOCUMENTS

| | | | |
|---|---|---|---|
| 3,577,190 | 5/1971 | Cocke et al. | 340/172.5 |
| 4,155,120 | 5/1979 | Keefer et al. | 364/200 |
| 4,212,060 | 7/1980 | Prey | 364/200 |
| 4,370,711 | 1/1983 | Smith | 364/200 |
| 4,390,946 | 6/1983 | Lane | 364/200 |
| 4,477,872 | 10/1984 | Losq et al. | 364/200 |
| 4,604,691 | 8/1986 | Akagi | 364/200 |
| 4,679,141 | 7/1987 | Pomerene et al. | 364/200 |
| 4,714,994 | 12/1987 | Oklobdzija et al. | 364/200 |
| 4,725,947 | 2/1988 | Shonai et al. | 364/200 |
| 4,755,966 | 7/1988 | Lee et al. | 364/900 |
| 4,757,445 | 7/1988 | Zolnowsky et al. | 364/200 |
| 4,763,245 | 8/1988 | Emma et al. | 364/200 |
| 4,764,861 | 8/1988 | Shibuya | 364/200 |
| 4,777,587 | 10/1988 | Case et al. | 364/200 |
| 4,777,594 | 10/1988 | Jones et al. | 364/200 |
| 4,827,402 | 5/1989 | Wada | 364/200 |
| 4,831,517 | 5/1989 | Crouse et al. | 364/200 |
| 4,835,679 | 5/1989 | Kida et al. | 364/200 |
| 4,847,753 | 7/1989 | Matsuo et al. | 364/200 |
| 4,853,840 | 8/1989 | Shibuya | 364/200 |
| 4,855,904 | 8/1989 | Daberkow et al. | 364/200 |
| 4,855,947 | 8/1989 | Zmyslowski et al. | 364/200 |
| 4,858,104 | 8/1989 | Matsuo et al. | 364/200 |
| 4,860,197 | 8/1989 | Langendorf et al. | 364/200 |
| 4,860,199 | 8/1989 | Langendorf et al. | 364/200 |
| 4,870,573 | 9/1989 | Kawata et al. | 364/200 |

(List continued on next page.)

OTHER PUBLICATIONS

"Hierarchical Cache/Bus Architecture for Shared Memory Multiprocessors", by Wilson, Jr., Conference Proceedings, IEEE 14th Symposium on Computers, 1987.

"Effects of Cache Coherency in Multiprocessors" by Dubois et al., IEEE Trans. on Computers, vol. C–31, No. 11, Nov., 1982.

"Data Processing System with Second Level Cache", IBM Technical Disclosure Bulletin, v. 21, No. 6, pp. 2468–2469, Nov. 1978.

Smith et al., "Implementing Precise Interrupts in Pipelined Processors", IEEE, vol. 37, No. 5, 1988, pp. 562–573.

Wu et al., "Checkpoint Repair for Out–of–Order Execution Machines", ACM 1987, pp. 18–26.

Sohi et al., "Instruction issue Logic for High–Performance Interruptable Pipelined Processors", ACM 1987, pp. 27–34.

*Primary Examiner*—Parshotam S. Lall
*Assistant Examiner*—Saleh Najjar
*Attorney, Agent, or Firm*—Charles A. Johnson; Mark T. Starr; Crompton, Seager and Tufte LLC

[57] ABSTRACT

An apparatus for and method of providing a data processing system that delays the writing of an architectural state change value to a corresponding architectural state register for a predetermined period of time. This may provide the instruction processor with enough time to determine if the architectural state change is valid before the architectural state change is actually written to the appropriate architectural state register.

45 Claims, 23 Drawing Sheets

U.S. PATENT DOCUMENTS

| | | | |
|---|---|---|---|
| 4,872,109 | 10/1989 | Horst et al. | 364/200 |
| 4,875,160 | 10/1989 | Brown, III | 364/200 |
| 4,881,170 | 11/1989 | Morisada | 364/200 |
| 4,888,689 | 12/1989 | Taylor et al. | 364/200 |
| 4,890,225 | 12/1989 | Ellis, Jr. et al. | 364/200 |
| 4,891,754 | 1/1990 | Boreland | 364/200 |
| 4,894,772 | 1/1990 | Langendorf | 364/200 |
| 4,910,664 | 3/1990 | Arizono | 364/200 |
| 4,912,635 | 3/1990 | Nishimukai et al. | 364/200 |
| 4,914,579 | 4/1990 | Putrino et al. | 364/200 |
| 4,916,602 | 4/1990 | Itoh | 364/200 |
| 4,924,376 | 5/1990 | Ooi | 364/200 |
| 4,926,312 | 5/1990 | Nukiyama | 364/200 |
| 4,926,323 | 5/1990 | Baror et al. | 364/200 |
| 4,942,520 | 7/1990 | Langendorf | 364/200 |
| 4,953,121 | 8/1990 | Muller | 364/900 |
| 4,964,046 | 10/1990 | Mehrgardt et al. | 364/200 |
| 4,980,823 | 12/1990 | Liu | 364/200 |
| 4,984,154 | 1/1991 | Hanatani et al. | 364/200 |
| 5,008,807 | 4/1991 | Krueger et al. | 364/200 |
| 5,014,196 | 5/1991 | Hayashi et al. | 364/200 |
| 5,040,107 | 8/1991 | Duxbury et al. | 364/200 |
| 5,051,896 | 9/1991 | Lee et al. | 364/200 |
| 5,081,574 | 1/1992 | Larsen et al. | 395/375 |
| 5,121,473 | 6/1992 | Hodges | 395/375 |
| 5,121,488 | 6/1992 | Ngai | 395/375 |
| 5,142,630 | 8/1992 | Ishikawa | 395/375 |
| 5,280,592 | 1/1994 | Ryba et al. | 395/395 |
| 5,363,490 | 11/1994 | Alferness et al. | 395/375 |
| 5,434,986 | 7/1995 | Kuslak et al. | 395/375 |
| 5,459,845 | 10/1995 | Nguyen et al. | 395/375 |
| 5,522,084 | 5/1996 | Ando | 395/800 |
| 5,590,293 | 12/1996 | Uhler et al. | 395/581 |
| 5,590,351 | 12/1996 | Sowadsky et al. | 395/800 |
| 5,604,878 | 2/1997 | Colwell et al. | 395/393 |

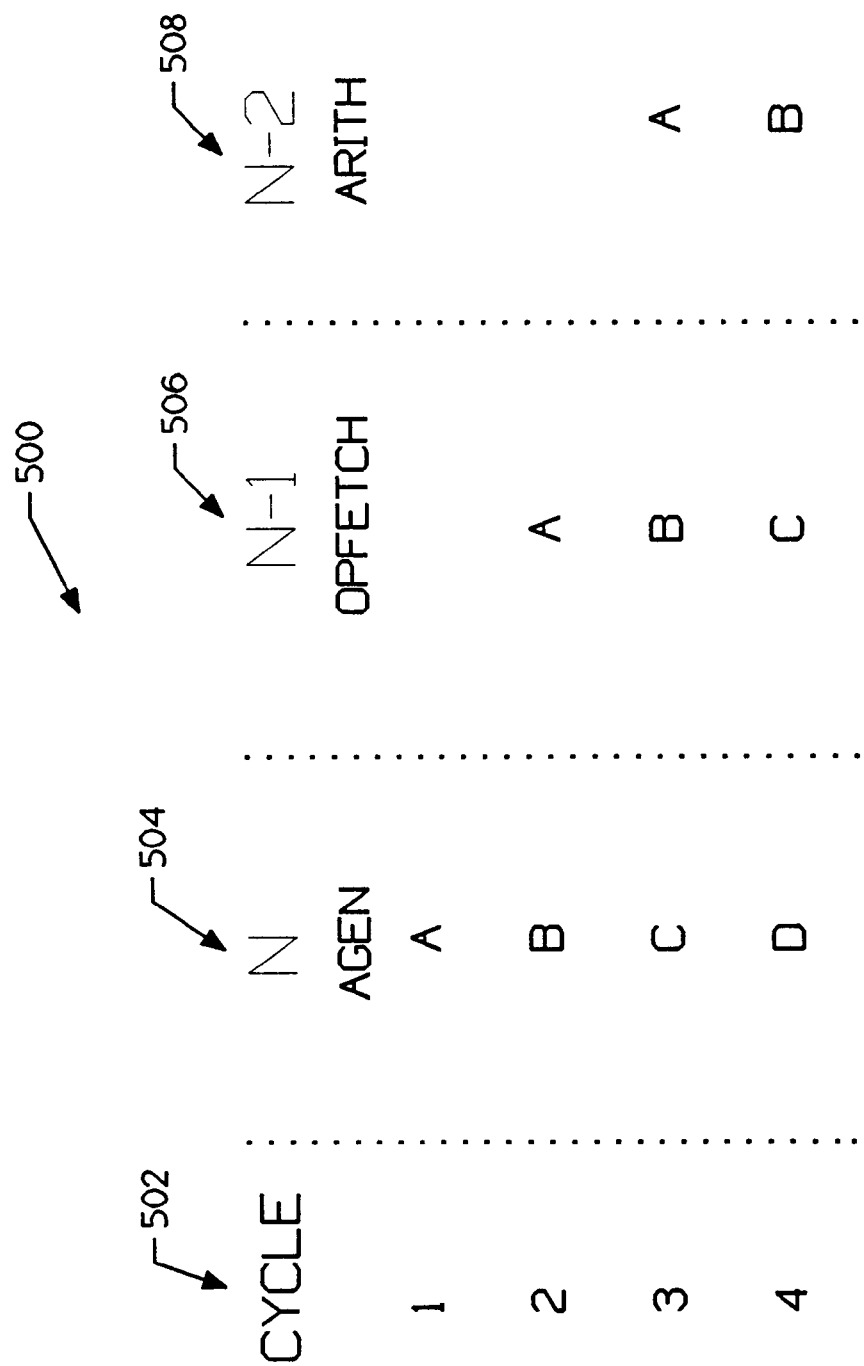

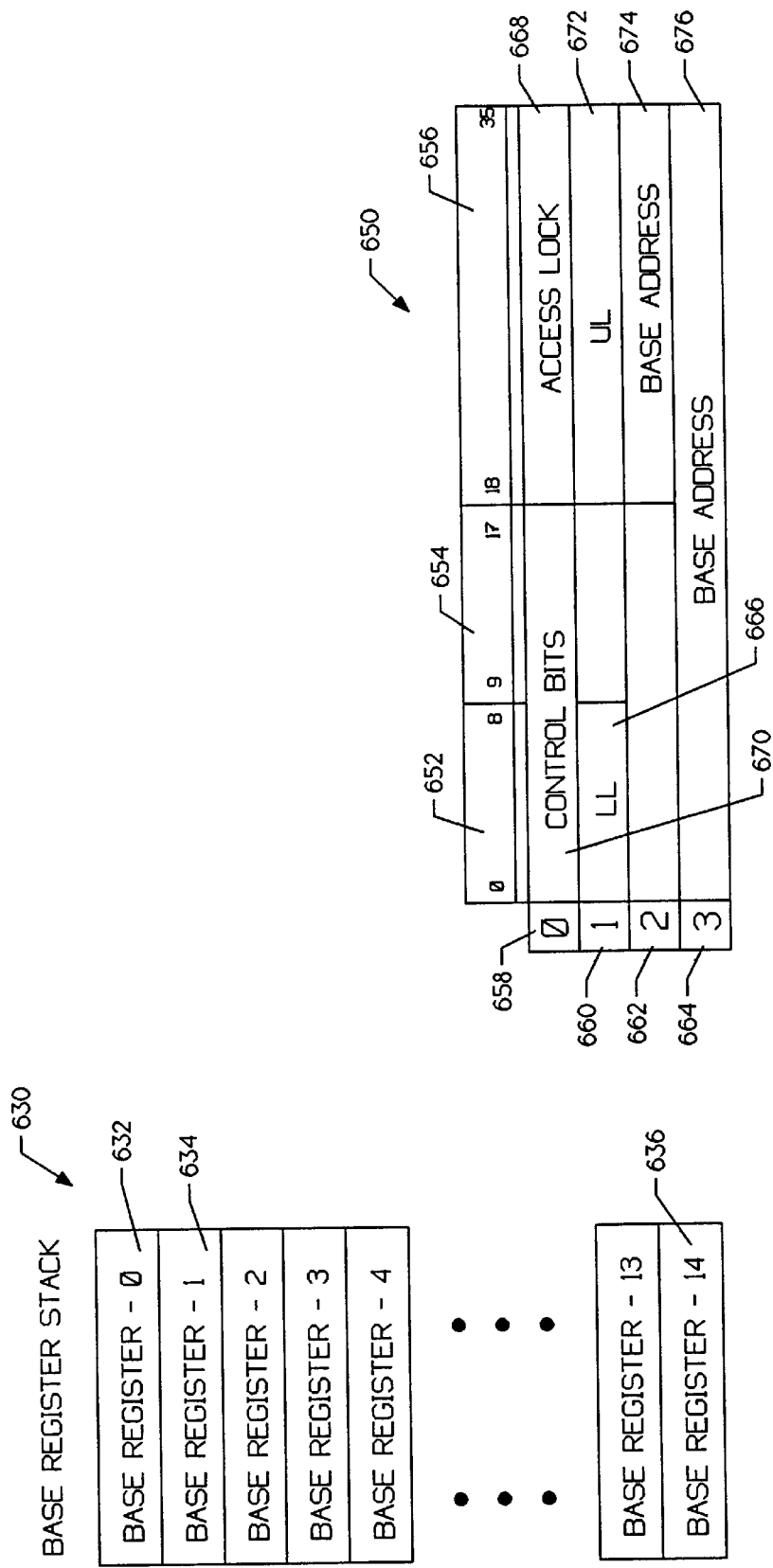

DELAYED STATE WRITES FOR AN INSTRUCTION PROCESSOR

CROSS REFERENCE TO CO-PENDING APPLICATIONS

The present application is a continuation of U.S. Ser. No. 08/564,947, filed Nov. 30, 1995, now abandoned entitled "Delayed State Writes for an Instruction Processor", which is related to U.S. patent application Ser. No. 08/566,116, filed Nov. 30, 1995, entitled "Method and Apparatus for Rapidly Loading Addressing Registers", U.S. patent application Ser. No. 07/762,282, filed Sep. 19, 1991, entitled "Cooperative Hardware and Microcode Control System for Pipelined Instruction Execution", now abandoned and U.S. patent application Ser. No. 07/762,276, filed Sep. 19, 1991, entitled "Data Coherency Protocol for Multi-Level Cached High Performance Multiprocessor System", now U.S. Pat. No. 5,198,215 all assigned to the assignee of the present invention and all incorporated herein by reference.

BACKGROUND OF THE INVENTION

1. Field of the Invention

The present invention generally relates to general purpose digital data processing systems and more particularly relates to such systems that employ pipelined execution of program instructions.

2. Description of the Prior Art

In most general purpose, stored program, digital computers, software is developed under the assumption that program instructions are executed in their entirety in a sequential fashion. This frees the software developer from the need to account for potential non-sequential operation of the hardware. However, most large scale modern machines are designed to take advantage of the overlapping of various functions. In its simplest form, such overlapping permits instruction processing of the N+1st instruction to be performed during operand processing of the Nth instruction. U.S. Pat. No. 4,890,225 issued to Ellis, Jr. et al. shows a rudimentary overlapped machine. To free the software developer from concerns about non-sequentiality, Ellis Jr. et al. store the machine state during the complete execution of the Nth instruction. U.S. Pat. No. 4,924,376 issued to Ooi provides a technique for resource allocation in an overlapped environment.

A more general form of overlapping is termed a pipelined environment. In implementing such a machine, the designer dedicates certain hardware resources to the various repetitive tasks. The performance advantage in this dedication comes from employing these dedicated hardware elements simultaneously. Typically, this means that instruction decode, operand fetch, and arithmetic operations each have separate and dedicated hardware resources. Even though the Nth instruction is processed by each of these hardware resources sequentially, each separate hardware resource is deployed on a different instruction simultaneously. The N+1st instruction may be processed by the instruction fetch and decode hardware, while the Nth instruction is being processed by the operand fetch hardware and while the N-1st instruction is being processed by the arithmetic hardware. U.S. Pat. No. 4,855,904 issued to Daberkow, et al. describes a pipelined architecture.

The problems associated with sequentiality experienced by software developers are magnified when considering microcode controlled machines operating in a pipelined mode. The performance advantages of the pipelined architecture can be readily dissipated by timing problems within the machine. U.S. Pat. No. 4,875,160 issued to Brown III discusses a number of pipeline based problems including conditional branching of microcode. The Brown III system accommodates pipeline exceptions by extending performance time for one or more clock cycles. U.S. Pat. No. 4,980,823 issued to Liu seeks to minimize the impact of branching on performance by prefetching of predicted data.

Other approaches to the problem include "de-piping". That is simply forcing serial performance of all functions until the pipeline exception is accommodated. U.S. Pat. No. 5,014,196 issued to Hayashi et al. suggests this approach for certain types of pipeline problems.

Another way to provide protection for microcode branching is by using non-staged control. In this approach, each microcode instruction becomes a family of instructions which provide for the various permutations and combinations associated with the branch conditions. Each member of this instruction family controls all stages for a single clock cycle rather than only one stage per cycle for a number of clock cycles. U.S. Pat. No. 4,891,754 issued to Boreland suggests such an approach. Non-staged design tends to cause additional complexity in microcode design. Boreland approaches this problem by providing additional read only memory to store the combinations. U.S. Pat. No. 4,835,679 issued to Kida et al. and U.S. Pat. No. 4,872,109 issued to Horst et al. show that read only memory space can be saved by slowing the pipeline during conditional branching.

For many of these prior art systems, a goal is to maintain a valid architectural state of a corresponding data processing system while at the same time, maximizing the performance thereof. For example, an instruction following a conditional branch instruction may alter the architectural state of a data processing system before the data processing system determines if the branch will be taken. That is, it is known that most microprocessors and data processing systems have a number of software architectural registers wherein the architectural state of a machine may be defined by a number of values stored in the software architectural registers. Typically, the software architectural registers are defined by a software specification of the microprocessor or data processing system. It is further known that the software architectural registers may be used to pass values from one instruction to another. Software architectural registers are often referred to as architectural registers, software visible registers, a working register set, or a General Register Set (GRS).

Under certain circumstances, the modification of the architectural state of the machine may become problematic when a dependency exists between instructions. An example of such an instruction is a load A with address incrementation instruction. The load A with address incrementation instruction may change the architectural state of the machine by incrementing the operand address, which may be stored in one of the architectural state registers, during the same pipeline stage that the operand address is generated. An advantage of this approach is that the incremented operand address may be used during address generation of a next succeeding instruction.

While this may increase the performance of operand address generation for a subsequent instruction, it is problematic in many systems because the architectural state of the machine may be improperly changed in view of a subsequent event. This may typically occur when there is some dependency between the corresponding instructions.

For example, it may not be known if a conditional branch instruction will in fact change the normal sequential execution of the instructions until the third stage (the arithmetic operation stage) of the pipeline. Accordingly, a subsequent instruction may modify the architectural state of the machine by writing an incremented address, for example, to the GRS before it is determined whether the branch instruction will in fact change the normal sequential execution of the instructions. If the condition of the conditional branch instruction is later determined to be satisfied, thereby indicating that the normal sequential operation of the instructions is to be changed, the architectural state change of the subsequent instruction may be improper.

U.S. Pat. No. 5,040,107 issued to Duxbury et al. addresses this problem by operating the pipeline until a dependency is found between instructions using a look-ahead technique. The dependency is resolved by aborting the second (i.e. dependent) instruction to preserve sequentiality resulting in a performance penalty. U.S. Pat. No. 5,363,490 issued to Alferness et al. suggests an improvement to this basic approach by utilizing a technique for conditional aborting an instruction within an instruction processor when a dependency is found.

Another related problem is when the architectural state of the machine is changed before a corresponding fault or interrupt signal can be provided to the instruction processor. For example, and as indicated above, the Load A with address incrementation instruction may generate an operand address and may then increment the operand address during the first pipeline stage. This may allow the incremented operand address to be used during address generation of a next succeeding instruction.

A problem may arise when a corresponding fault or interrupt is not determined until the third pipeline stage (e.g. the arithmetic stage) of the instruction pipeline. For example, the Load A instruction discussed above may perform an address limits check to ensure the address generated for the corresponding operand is within a previously allocated address space. If the address of the operand is not within the allocated address space, an address limits fault may be provided to the instruction processor. Accordingly, the load A with address incrementation instruction may change the architectural state of the machine by writing an incremented operand address to the GRS, before the corresponding limits check fault is provided to the pipelined instruction processor. In order to continue processing, it may be necessary to restore the architectural state of the machine as it existed just prior to the execution of the Load A instruction. A substantial amount of microcode may be required to restore the proper architectural state of the machine. Further, a substantial amount of time may be required to execute the microcode restore algorithms.

SUMMARY OF THE INVENTION

The present invention overcomes many of the disadvantages of the prior art by providing a data processing system that delays the writing of an architectural state change value to a corresponding architectural state register for a predetermined period of time. This may provide the instruction processor with enough time to determined if the architectural state change is valid before the architectural state change is actually written to the appropriate architectural state register.

In an exemplary embodiment, a conditional branch instruction and a subsequent instruction may be sequentially executed by a number of pipeline stages of an instruction processor. The subsequent instruction may provide an architectural state change value to a corresponding architectural state register before the instruction processor determines if the branch instruction will in fact change the normal sequential execution of the instructions. The present invention may delay the writing of the architectural state change value provided by the subsequent instruction until the instruction processor determines if the branch instruction will in fact change the normal sequential execution of the instructions. Accordingly, if the branch instruction does not change the normal sequential execution of the instructions, the architectural state change value may be written to the corresponding architectural state register to affect such change. If, however, the branch instruction changes the normal sequential execution of the instructions, thereby aborting the execution of the subsequent instruction, the architectural state change may be discarded. This may prevent the need to slip the instruction pipeline even through a potential dependency is found between two instructions. It is contemplated that the conditional branch instruction may be a skip instruction.

In accordance with the present invention, a wrap logic block may be provided to control the architectural state change value while it is being delayed. It is recognized that it may be desirable for another instruction to have access to the architectural state change value while the architectural state change value is being delayed, and prior to being written to a corresponding architectural state register. Accordingly, the wrap logic block may, inter alia, allow another instruction within the instruction pipeline to access the architectural state change value, even through the architectural state change value has not yet been written to the corresponding architectural state register. In an exemplary embodiment, the architectural state change value may be provided to any of a number of pipeline stages within the instruction processor, as desired, including a first pipeline stage.

In another exemplary embodiment, the execution of an instruction may cause a fault or interrupt signal to be provided to the instruction processor. Further, the execution of the instruction may provide an architectural state change value to a corresponding architectural state register before the fault or interrupt signal is provided. Thus, in accordance with the present invention, the writing of the architectural state change value to the corresponding architectural state register may be delayed until the fault or interrupt signal is provided to the instruction processor. If a fault or interrupt signal is not provided, the architectural state change value may be written to the corresponding architectural state register. If, however, a fault or interrupt signal is provided, the architectural state change value may be discarded, thereby eliminating the need for substantial microcode driven algorithms to restore the architectural state of the machine.

In a preferred embodiment of the present invention, a data processing system may be provided wherein the data processing system includes a pipelined instruction processor having a number of pipeline stages for executing a number of instructions including a first instruction and a second instruction. Both the first instruction and the second instruction may be sequentially executed by respective ones of the number of pipelined stages with the first instruction entering the pipelined instruction processor first. The first instruction may be a conditional branch instruction thereby preventing the normal sequential execution of the second instruction upon the satisfaction of a condition. The second instruction may be an instruction that provides a result that changes the architectural state of the data processing system before the pipelined instruction processor may determine if the condition of the first instruction is satisfied.

A determining means may be provided for determined whether the condition of the first instruction is satisfied, thereby determining if the first instruction will in fact prevent the normal sequential execution of the second instruction. Furthermore, a delay means may be provided to delay the writing of the result of the second instruction to a corresponding architectural state register until the determining means determines whether the first instruction will in fact prevent the normal sequential execution of the second instruction. The delay means may be provided by sequentially storing the result of the second instruction in a number of delay staging registers. Each of the number of delay staging registers may correspond to a predetermined one of the number of pipeline stages.

It is contemplated that the number of pipeline stages may include a first stage, a second stage and a third stage. The first instruction may be executed by the first stage during a first pipeline cycle, and may be executed by the second stage during a second pipeline cycle, and may be executed by the third stage during a third pipeline cycle. Further, the second instruction may be executed by the first stage during the second pipeline cycle, and may be executed by the second stage during the third pipeline cycle, and may be executed by the third stage during a fourth pipeline cycle.

The second instruction may provide a result to the corresponding architectural state register during the second pipeline cycle, and the determining means may determine if the condition of the first instruction is satisfied during the third pipeline cycle. Accordingly, the delay means may delay the result of the second instruction from altering the architectural state of the data processing system until after the determining means determines whether the condition of the first instruction is satisfied (e.g. the fourth pipelined cycle).

It is further contemplated that the first stage of the pipelined instruction processor may perform address generation for a requested operand. The operand may be referenced via a relative operand address wherein the second instruction may directly or indirectly provide a base register address, an index register address, and a U-field during the first pipeline cycle. The base register address corresponds to a location within a base register and the index register address corresponds to a location within an index (X) register. The corresponding base value and the corresponding X value may be added to the U field to form a corresponding absolute operand address, which may be used during the second pipeline cycle to fetch the corresponding operand from an operand cache memory. A further discussion of absolute address generation may be found in the above referenced U.S. patent application Ser. No. 07/762,282, filed Sep. 19, 1991, entitled "Cooperative Hardware and Microcode Control System for Pipelined Instruction Execution", which is incorporated herein by reference.

During predetermined instructions, the corresponding index (X) register value may be incremented during operand address generation. Thus, in the preferred embodiment, it is contemplated that the result of the second instruction may be an incremented index (X) register value, as described above. In a preferred embodiment, it is the writing of this incremented index (X) value to the index register that may be delayed by the above referenced delay means.

Finally, it is contemplated that an aborting means may be provided for aborting the execution of the second instruction and preventing the result of the second instruction from altering the state of the pipelined instruction processor if the determining means determines that the first instruction will in fact change the normal sequential execution of the second instruction.

In another preferred embodiment, the execution of an instruction by the pipelined instruction processor may produce a fault or interrupt signal. The fault or interrupt signal may interrupt the normal execution of the instructions in the pipeline instruction processor. As indicated above, predetermined instructions may increment the corresponding index (X) register value during a first pipeline stage (operand address generation). However, a fault or interrupt condition may not be determined until the third pipeline stage (arithmetic operations). Thus, in accordance with the present invention, a delay means may be provided to delay the writing of the incremented index register value to the index register until the fault or interrupt condition is determined.

In the preferred embodiment, the index register value is written to the index register during a fourth pipeline cycle. If a fault or interrupt signal is not provided, the index register value may be written to the corresponding index register as described above. If, however, a fault or interrupt signal is provided, the execution of the instructions may be halted, and the index register value may be discarded. This may eliminate the need for substantial microcode driven algorithms to restore the architectural state of the machine following a fault or interrupt condition.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 11A schematically shows the operation of the three position pipeline;

FIG. 13 shows an exemplary base register stack;

FIG. 14 show a typical base register entry;

DETAILED DESCRIPTION OF THE PREFERRED EMBODIMENTS

Figure 1:
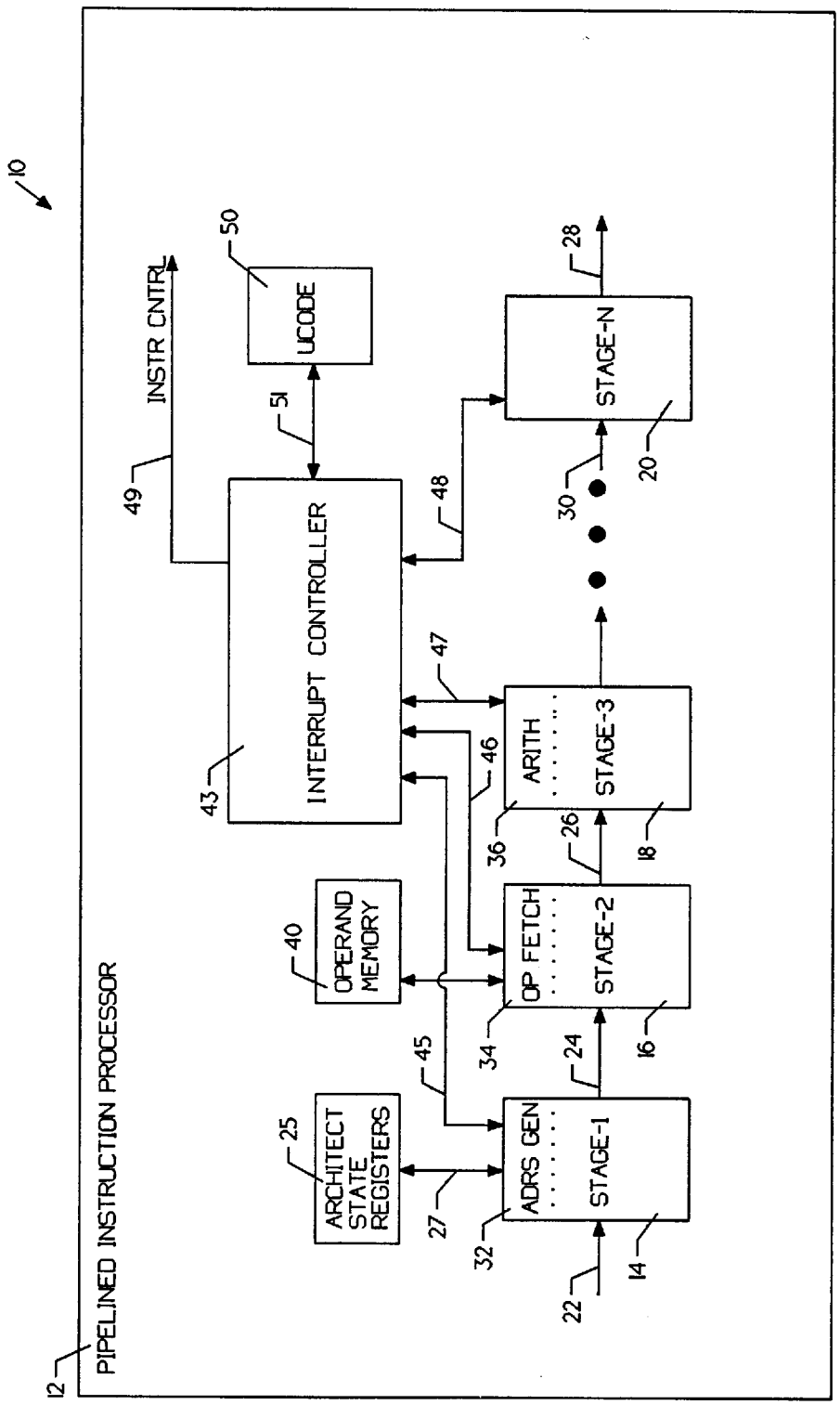
FIG. 1 is a block diagram of a prior art pipelined instruction processor.

FIG. 1 is a block diagram of a prior art pipelined instruction processor. The diagram is generally shown at 10. Pipelined instruction processor 12 may include a number of pipelined stages including stage-1 14, stage-2 16, stage-3 18, and stage-N 20. Stage-1 14 receives a first instruction via interface 22 during a first pipeline cycle from an instruction decode block or equivalent. The first instruction may include an operand address indicator for specifying a predetermined operand to be used in conjunction with the first instruction.

Stage-1 14 may include an operand address generation block ADRS GEN 32, wherein ADRS GEN 32 may receive the operand address indicator from the first instruction. Typically, the operand address indicator may be a relative address including a base address, an indexing address, and a U-field. The base address may reference one of a number of base registers and the indexing address may reference one of a number of indexing registers. ADRS GEN 32 may add the corresponding base value, index value, and U-field to calculate a corresponding absolute operand address. A further discussion of absolute address generation may be found in the above referenced U.S. patent application Ser. No. 07/762,282, filed Sep. 19, 1991, entitled "Cooperative Hardware and Microcode Control System for Pipelined Instruction Execution", which is incorporated herein by reference.

During a second pipeline cycle, the first instruction may be passed to stage-2 16 via interface 24, including the absolute operand address generated by ADRS GEN 32. The absolute operand address may be used by an OP FETCH block 34 to fetch the corresponding operand from operand memory 40. Also during the second pipeline cycle, a second instruction may be provided to stage-1 14 via interface 22, wherein a second operand address may be generated by ADRS GEN 32.

During a third pipeline cycle, the first instruction may be passed to stage-3 18 via interface 26, including the operand provided by stage-2 16. Stage-3 18 may include an arithmetic block 36 which may use the operand provided by stage-2 16 to compute a result. Also during the third pipeline cycle, the second instruction may be provided to stage-2 16 via interface 24, wherein a second operand may be fetched from memory 40. Further, a third instruction may be passed to stage-1 14 via interface 22, wherein a third operand address may be generated.

Referring back to ADRS GEN 32, it is contemplated that the state of the data processing system may be altered during address generation by writing an incremented address value to an architectural state register 25. For example, a load A instruction with address incrementation may increment the operand address after generating the address for the operand A, and may write the incremented address to architectural state register 25 via interface 27. This may allow a succeeding instruction to access the incremented operand address during the corresponding address generation stage. It is contemplated that the architectural state register may be an index register as discussed above.

This may present a problem in many systems because the architectural state of the machine may need to be restored to a previous state in view of subsequent events. For example, the condition of a conditional branch instruction may not be determined until the branch instruction reaches stage-3 18 (the arithmetic operation stage) of the instruction pipeline. An N+1st (or subsequent) instruction following the conditional branch instruction may modify the state of the machine by writing to architectural state register 25 before it is determined whether the branch instruction will in fact change the normal sequential execution of the instruction processor. Accordingly, if the condition of the conditional branch instruction is satisfied, the architectural state change cause by the N+1st (or subsequent) instruction may need to be backed out, and a previous state may need to be restored.

To avoid these problems, prior art systems typically depipe the instruction processor whenever the N+1st (or subsequent) instruction may change the state of the machine. The instruction processor may remain in a depiped condition until it is determined whether the condition of the conditional branch instruction is satisfied. As can readily be seen, this may cause a substantial performance penalty and thus reduce overall system performance.

Another related problem may occur when the architectural state of the machine is changed before a corresponding fault or interrupt signal can be provided to the instruction processor 12. Typically, an interrupt controller 43 may be provided for controlling fault and/or interrupt conditions within instruction processor 12. Interrupt controller 43 may be coupled to one or more of the pipeline stages 14, 16, 18 and 20. For the exemplary instruction processor 12, interrupt controller is coupled to stage-1 14, stage-2 16, stage-3 18, and stage-N 20 via interfaces 45-48, respectively. Interrupt controller 43 may also provide an instruction control signal to an instruction sequencer (not shown) via interface 49. Finally, interrupt controller 43 may be controlled by microcode provided by ucode block 50 via interface 51.

When a fault or interrupt condition is detected by interrupt controller 43, instruction control signal 49 is asserted such that the instruction sequencer (not shown) may abort the execution of any or all instructions in pipeline stage-1 14 through stage-N 20 via interfaces 45-48, respectively. If necessary, the architectural state of the machine may then be restored to the architectural state as it existed just prior to the fault.

For example, and as indicated above, the Load A with address incrementation instruction may generate an operand address and may then increment the operand address during the first pipeline cycle. Further, the incremented operand address may be written to an architectural state register 25 during the first pipeline cycle. This may allow the incremented operand address to be used during address generation of a next succeeding instruction. A problem may arise when a corresponding fault or interrupt is not determined until the third pipeline stage-18 (e.g. the arithmetic stage) of the instruction pipeline. For example, the Load A instruction may perform an address limits check to ensure the address generated for the corresponding operand is within a predefined address space. If the address of the operand is not within the assigned address space, an address limits fault may be provided by stage-3 18 to interrupt controller 43 via interface 47. It is common for an address limits fault to be determined by an arithmetic operation performed by ARITH block 36, during the third pipeline cycle. Accordingly, the load A with address incrementation instruction may change the architectural state of the machine before the corresponding limits check fault is provided to interrupt controller 43.

In the event a fault or interrupt is detected, and in order to continue processing, it may be necessary to restore the architectural state of the machine as it existed just prior to the execution of the Load A instruction. However, a substantial amount of microcode stored in ucode block 50 may be required to restore the proper architectural state of the machine. Further, a substantial amount of time may be required to execute the microcode restore algorithms.

Figure 2:
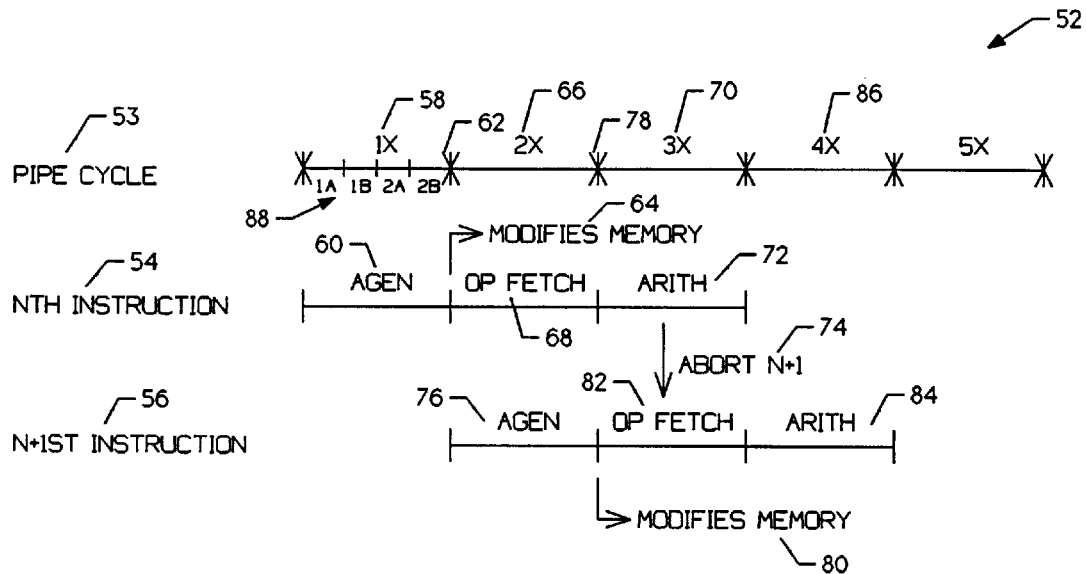
FIG. 2 is a timing diagram showing a first exemplary operation of the prior art pipelined instruction processor of FIG. 1.

FIG. 2 is a timing diagram showing a first exemplary operation of the prior art pipelined instruction processor of FIG. 1. The diagram is generally shown at 52. A number of pipelined cycles are shown at 53 including a first pipeline cycle 58, a second pipeline cycle 66, a third pipeline cycle 70, and a fourth pipeline cycle 86. Each of the pipeline cycles is divided into a first half and a second half as shown at 88. Each half is further divided into quarter cycles. The first quarter cycle is designated "1A", indicating it is in the first "1" half cycle of the major pipeline cycle 58, and is the first "A" quarter cycle in that half cycle. Similarly, the remaining quarter cycles are designated as "1B", "2A" and "2B", respectively.

During the first pipeline cycle 58, an Nth instruction 54 is clocked into stage-1 14 (see FIG. 1), wherein an operand address is calculated as shown at AGEN 60. Certain predetermined instructions may then modify an architectural state register 25 at time 62 as shown at 64, thereby modifying the state of the machine. During the second pipeline cycle 66, the Nth instruction 54 is provided to stage-2 16, wherein the corresponding operand is fetched as shown at 68. Also during the second pipeline cycle 66, an N+1 instruction 56 is clocked into stage-1 14, wherein an operand address is calculated as shown at 76. At time 78, the N+1 instruction 56 may modify an architectural state register 25 as shown at 80, thereby modifying the state of the machine. During the third pipeline cycle 70, the Nth instruction 54 is provided to stage-3 18, wherein an arithmetic operation may be performed using the operand fetched during the second pipeline cycle 66.

If the Nth instruction 54 is a conditional branch instruction, the condition of the conditional branch instruction is determined during the arithmetic operation as shown at 72. If the condition of the conditional branch instruction is satisfied, thereby indicating that the N+1 instruction 56 must be aborted, the conditional branch instruction may provide an abort N+1 signal 74 during the third pipeline cycle 70 as shown. However, as indicated above, the N+1 instruction 56 has already modified an architectural state register 25, and thus, the architectural state of the machine.

For a fault condition, if the Nth instruction is a load A with address incrementation instruction, the architectural state of the machine may be modified during address generation at time 62. Further, the load A instruction may perform an address limits check during the arithmetic operation as shown at 72. If an address limits fault is detected, an interrupt controller may provide an abort signal during the third pipeline cycle 70. In this case, the abort signal may abort the load A instruction and all subsequent instructions. However, both the load A instruction 54 and the N+1st instruction 56 may have already sequentially modified the architectural state of the machine as shown at 64.

In order to continue processing, it may be necessary to restore the architectural state of the machine as it existed just prior to the execution of the Load A instruction. It can readily be seen that a substantial amount of microcode may be required to restore the proper architectural state of the machine. Further, a substantial amount of time may be required to execute the microcode restore algorithms.

Figure 3:
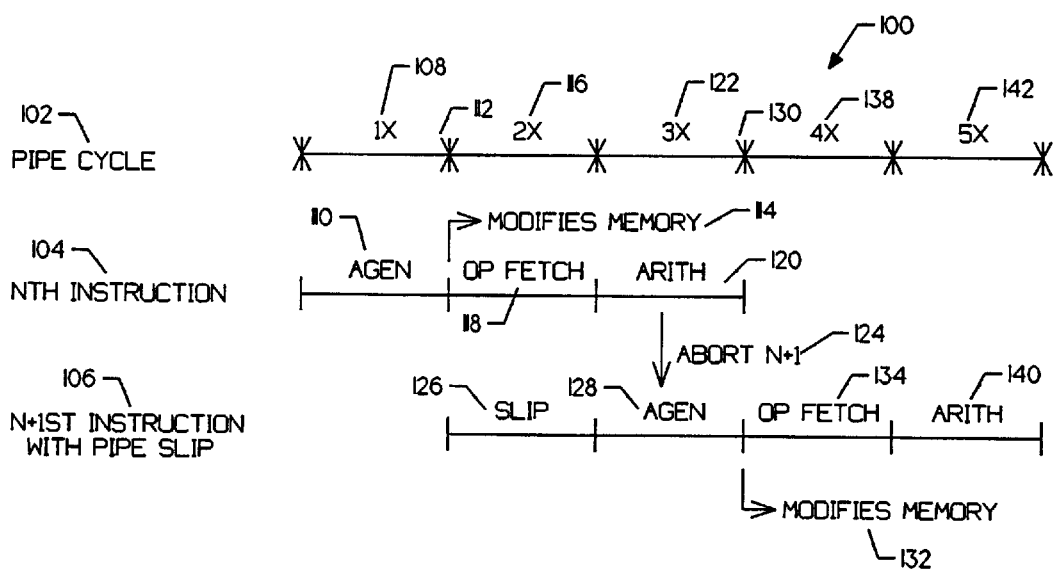
FIG. 3 is a timing diagram showing a second exemplary operation of the prior art pipelined instruction processor of FIG. 1, including the slipping of the N-1st instruction by one pipeline cycle.

FIG. 3 is a timing diagram showing a second exemplary operation of the prior art pipelined instruction processor of FIG. 1, including the slipping of the N+1st instruction by one pipeline cycle. The diagram is generally shown at 100. To avoid the problems discussed with reference to FIG. 1 and FIG. 2, prior art systems typically slip or depipe the instruction processor whenever the N+1st 106 (or subsequent) instruction is dependent on the Nth instruction 104. In the case of a conditional branch instruction, the instruction processor may remain in a depiped condition until it is determined whether the condition of the conditional branch instruction is satisfied.

Referring to FIG. 3, and during a first pipeline cycle 108, an Nth instruction 104 may enter stage-1 14 (see FIG. 1) wherein an operand address may be generated as shown at 110. An architectural state register 25 may be modified at time 112 as shown at 114, thereby changing the state of the machine. During a second pipeline cycle 116, the Nth instruction 104 may be provided to stage-2 16, wherein the corresponding operand may be fetched as shown at 118. If the N+1st instruction 106 and the Nth instruction 104 have a dependency therebetween, the N+1st instruction may be slipped by one pipeline cycle as shown at 126. During a third pipeline cycle 122, the Nth instruction 104 may be provided to stage-3 18, wherein an arithmetic operation may be performed, and an abort N+1 signal may be provided as shown at 124.

Also during the third pipeline cycle 122, the N+1st instruction may be provided to stage-1 14, wherein an operand address may be generated as shown at 128. At time 130, the N+1st instruction may modify architectural state register 25 as shown at 132, thereby modifying the state of the machine. However, in this case, when the N+1st instruction is slipped by one pipeline cycle, the abort signal provided by the Nth instruction 104, may arrive before the N+1st instruction modifies the architectural state register 25. Thus, there may be sufficient time to abort the N+1st instruction before the state of the machine is improperly altered thereby. However, as can readily be seen, this may cause a substantial performance penalty and may reduce overall system performance.

A further limitation of the scheme described above with reference to FIG. 3 is that slipping the N+1st instruction may not prevent the problems associated with architectural state changes made by the Nth instruction 104 itself. For example, during the first pipeline cycle 108, the Nth instruction 104 may enter stage-1 14 (see FIG. 1) wherein an operand address may be generated as shown at 110. An architectural state register 25 may be modified at time 112 as shown at 114, thereby changing the state of the machine. During the second pipeline cycle 116, the Nth instruction 104 may be provided to stage-2 16, wherein the corresponding operand may be fetched as shown at 118. During a third pipeline cycle 122, the Nth instruction 104 may be provided to stage-3 18, wherein an operand address limits check may be performed. If an operand address limits fault is detected during the third pipeline cycle 122, the Nth instruction must be aborted and the architectural state of the machine must be restored to the state that existed just prior to the execution of the Nth instruction. Under these circumstances, it can readily be seen that slipping or depiping the instruction processor does not prevent unwanted architectural state changes. Thus, a substantial amount of microcode may still be necessary to restore the architectural state of the machine as described above.

Figure 4:
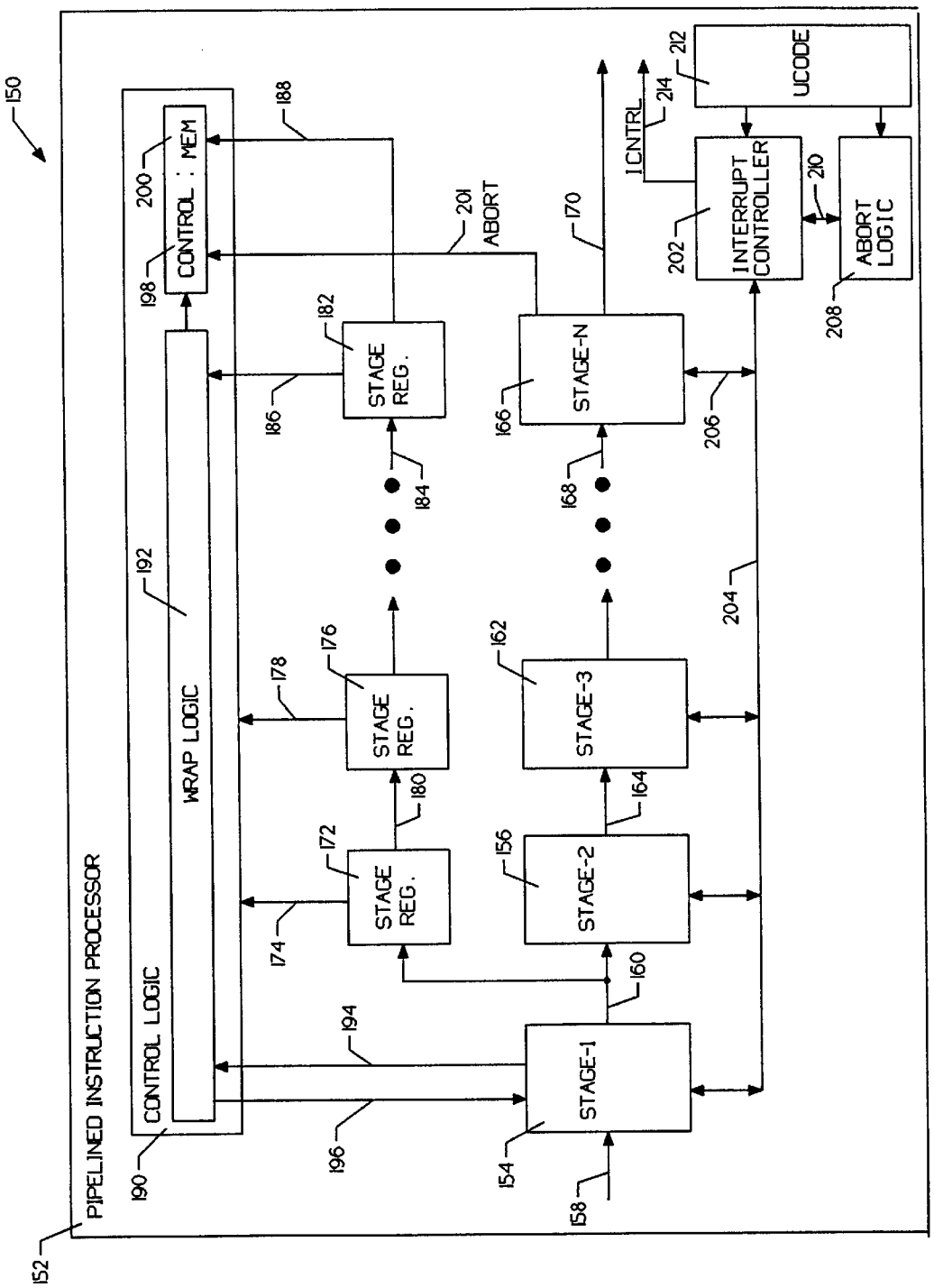
FIG. 4 is a block diagram showing a first exemplary embodiment of the present invention.

FIG. 4 is a block diagram showing a first exemplary embodiment of the present invention. The diagram is generally shown at 150. A pipelined instruction processor 152 may have a number of pipeline stages including a stage-1 154, a stage-2 156, a stage-3 162 and a stage-N 166. During a first pipeline cycle, a first instruction may be provided to stage-1 154 via interface 158. Stage-1 154 may execute at least a portion of the first instruction (see FIG. 11B) and may provide a first architectural state change value as described above.

During a second pipeline cycle, the first instruction may be provided to stage-2 156, and the first architectural state change may be provided to a first staging register 172 via interface 160. At the same time, a second instruction may be provided to stage-1 154 via interface 158, wherein stage-1 154 may execute at least a portion of the second instruction and may provide a second architectural state change.

During a third pipeline cycle, the first instruction may be provided to stage-3 162 via interface 164, and the corresponding first architectural state change may be provided to a second staging register 176 via interface 180. Similarly, the second instruction may be provided to stage-2 156 via interface 160, and the second architectural state change may be provided to the first staging register 172 via interface 160. Further, a third instruction may be provided to stage-1 154, resulting in a corresponding third architectural state change.

During an Nth pipeline cycle, the first instruction may be provided to stage-N 166 via interface 168, and the corresponding first architectural state change may be provided to an Nth staging register 182 via interface 184. The second instruction, second architectural state change, third instruction, and third architectural state change may be similarly transferred.

During the N+1st pipeline cycle, stage-N 166 may selectively provide an abort signal to control block 198 via interface 201. Similarly, the Nth staging register 182 may provide the architectural state change of the first instruction to memory 200 via interface 188. Memory 200 may comprise a number of architectural state registers. Control block 198 may control whether the architectural state change provided by the Nth staging register 182 is actually written to memory 200, thereby changing the architectural state of the data processing system.

It is contemplated that a control logic block 190 may be provided including a wrap logic block 192, control block 198, and memory 200. Wrap logic block 192 may receive signals from stage-1 154 via interface 194 and may provide a selected architectural state to stage-1 154 via interface 196. Further, wrap logic block 192 may access the architectural state changes that are stored in staging registers 172, 176, and 182 via interfaces 174, 178, and 186, respectively. In this configuration, wrap logic block 192 may selectively provide the architectural state changes stored in staging registers 172, 176, and 182 to stage-1 154, via interface 196. This may be beneficial if a subsequent instruction requires access to any of the architectural state change values provided by the previously executed instructions.

In accordance with the present invention, sequential execution of a branch instruction and a subsequent instruction may be simplified, particularly when the subsequent instruction may change the architectural state of the data processing system. For example, rather than allowing the subsequent instruction to change the architectural state of the data processing system during the first or second pipeline cycles, the architectural state change of the subsequent instruction may be temporarily stored in staging registers 172, 176, and 182, as described above. The writing of the architectural state change may be delayed in this manner until it is determined if the condition of the branch instruction is satisfied.

Referring specifically to FIG. 4, and assuming the first instruction is a conditional branch instruction, the satisfaction of the condition of the conditional branch instruction may be determined by stage-N 166. If the condition of the branch condition is satisfied, thereby indicating that the subsequent instruction should be aborted, an abort signal may be provided to control block 198 via interface 201. Control block 198 may then disable memory 200, thereby discarding the corresponding architectural state change. If, however, the condition of the branch instruction is not satisfied, stage-N 166 may not provide the abort signal and control block 200 may enable memory 200 such that the corresponding architectural state change stored in the Nth staging register 182 is written to memory 200. As can readily be seen, the present invention does not require the instruction processor to slip or depipe when a conditional branch instruction is executed.

In addition to the above, it is contemplated that instruction processor 12 may include an interrupt controller 202, abort logic 108, and a ucode block 212. Interrupt controller may be coupled to pipeline stages 154, 156, 162, and 166 via interface 204. Any of the pipeline stages 154, 156, 162 and 166 may provide an interrupt condition to interrupt controller 202 via interface 204. Interrupt controller 202 may also provide an instruction control signal to an instruction sequencer (not shown) via interface 214.

Abort logic 208 may be coupled to interrupt controller 202 via interface 210. Abort logic 208 may determine which, if any, of the instructions within the instruction pipeline to abort when the interrupt controller 202 receives an abort condition signal. It is contemplated that both interrupt controller 202 and abort logic 208 may be controlled by microcode stored in ucode 212.

In an exemplary application, and as indicated above, a Load A with address incrementation instruction may generate an operand address and may then increment the operand address during the first pipeline stage 154. This may allow the incremented operand address to be used during address generation of a next succeeding instruction. However, a corresponding fault or interrupt condition may not be determined until the Nth pipeline stage-N 166 (e.g. the arithmetic stage) of the instruction pipeline. For example, the Load A instruction may perform an address limits check to ensure the address generated for the corresponding operand is within a predefined address space. If the address of the operand is not within the assigned address space, an address limits fault may be provided by stage-N 166 to interrupt controller 202 via interface 206. Accordingly, it is evident that the load A with address incrementation instruction may provide an architectural state change before the corresponding limits check fault is provided to interrupt controller 202.

In accordance with the present invention, the architectural state change may be delayed via staging registers 172, 176, and 182 until the corresponding limits check fault is determined. If a fault is detected, stage-N 166 may provide an abort signal to control 198 via interface 201. Control 198 may disable memory 200, thereby discarding the corresponding architectural state change. If a fault is not detected, stage-N 166 may not provide an abort signal to control 198, and control 198 may permit the corresponding architectural state change to be written to memory 200, thereby effecting such architectural state change.

Figure 5:
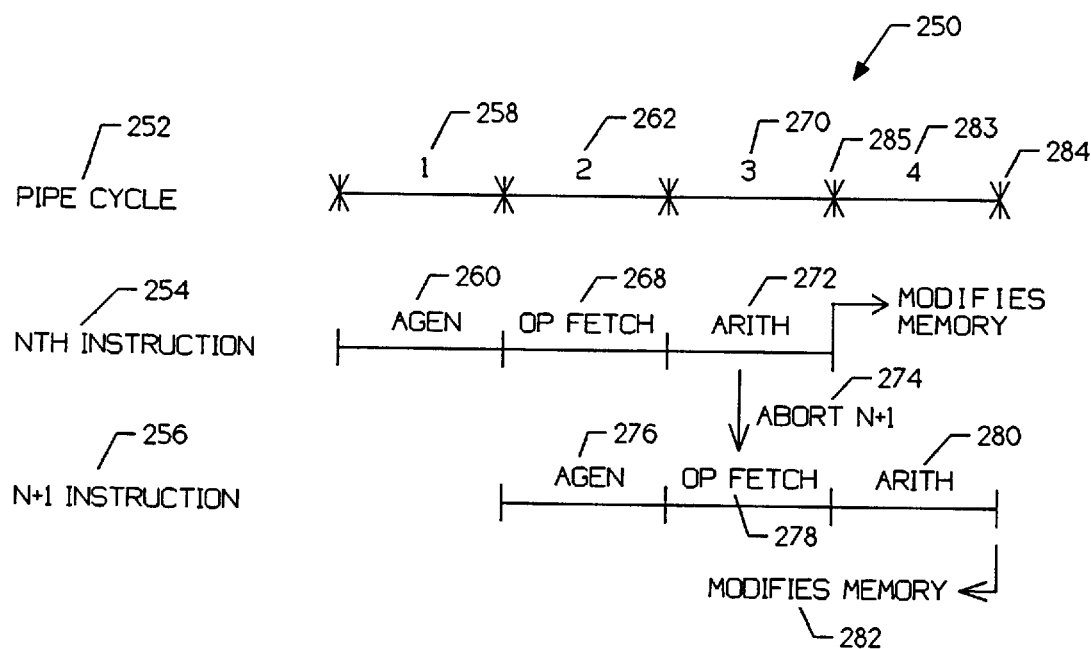
FIG. 5 is a timing diagram showing an exemplary operation of the first exemplary embodiment of FIG. 4.

FIG. 5 is a timing diagram showing an exemplary operation of the first exemplary embodiment of FIG. 4. The diagram is generally shown at 250. A number of pipelined cycles are shown at 252 including a first pipeline cycle 258, a second pipeline cycle 262, a third pipeline cycle 270, and a fourth pipeline cycle 283. For the exemplary timing diagram, only three pipeline stages are included in instruction processor 152.

During the first pipeline cycle 258, an Nth instruction 254 is clocked into stage-1 154 (see FIG. 4), wherein an operand address may be calculated as shown at AGEN 260. Further, the Nth instruction may provide a first architectural state change. During the second pipeline cycle 262, the Nth instruction 254 is provided to stage-2 156, wherein the corresponding operand is fetched as shown at 268. Further, the first architectural state change may be provided to the first staging register 172. Also during the second pipeline cycle 262, an N+1 instruction 256 may be clocked into stage-1 154, wherein an operand address is calculated as shown at 276. Further, the N+1 instruction 256 may provide a second architectural state change.

During the third pipeline cycle 270, the Nth instruction 254 is provided to stage-3 162, wherein an arithmetic operation may be performed using the operand fetched during the second pipeline cycle 262. Further, the first architectural state change may be provided to the second staging register 176. Also during the third pipeline cycle, the second instruction may be provided to stage-2 156, wherein the corresponding operand is fetched as shown at 278. At time 285, the first architectural state change may be written to memory 200 to affect such architectural state change.

If the Nth instruction 254 is a conditional branch instruction, the condition of the conditional branch instruction may be determined during the arithmetic operation of the first instruction, as shown at 272. If the condition of the conditional branch instruction is satisfied, thereby indicating that the N+1 instruction 256 must be aborted, the conditional branch instruction may provide an abort N+1 signal 274 during the third pipeline cycle 270 as shown.

During the fourth pipeline cycle 283, the N+1 instruction 256 is provided to stage-3 162, wherein an arithmetic operation may be performed using the operand fetched during the third pipeline cycle 270. At time 284, the N+1 instruction 256 may selectively provide the second architectural state change to memory 200. That is, if the Nth instruction did not provide an abort N+1 signal 274, control block 198 may allow the second architectural state change to be written to memory 200, thereby affecting the second architectural state change. If, however, the Nth instruction did provide an abort N+1 signal 274 during the third pipeline cycle 270, control block 198 may prevent the second architectural state change from being written to memory 200, thereby discarding the corresponding architectural state change. As can readily be seen, the N+1 instruction need not be slipped or depiped.

Referring back to the third pipeline cycle 270, if the first instruction provides a fault or interrupt condition at 274, control block 198 may prevent the first architectural state change from being written to memory 200, thereby discarding the first architectural state change. That is, because the first architectural state change is not written to memory 200 until after the fault or interrupt condition is determined, sufficient time exists to prevent the first architectural state change from being written to memory 200. Further, abort logic 208 may abort the first instruction and all appropriate subsequent instructions. As can readily be seen, the architectural state is either written or discarded, and no complex architectural restore algorithms are required.

Figure 6:
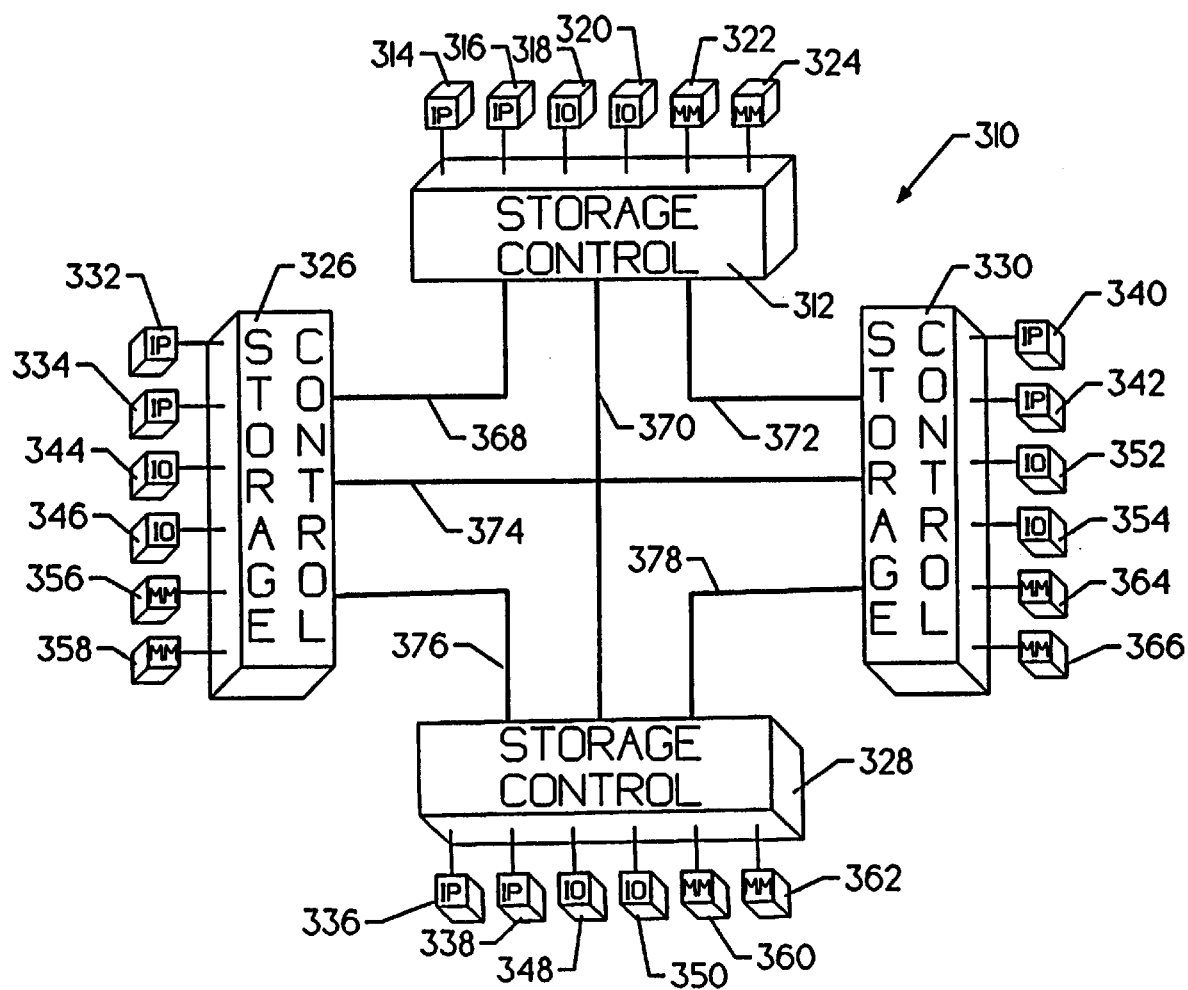
FIG. 6 is a schematic diagram of a fully populated data processing system incorporating the present invention.

FIG. 6 is a schematic diagram of a fully populated data processing system incorporating the present invention. Data processing system 310 includes four individual processing clusters, each having its own storage controller and each having point-to-point communication with the other clusters via a storage controller to storage controller interface.

Storage controller 312 is coupled to storage controller 326 via interface 368. Similarly, storage controller 312 is coupled to storage controller 328 via interface 370 and to storage controller 330 via interface 372. Storage controller 326 communicates with storage controller 328 via interface 376 and to storage controller 330 via interface 374. In similar fashion, storage controller 328 and storage controller 330 are coupled via interface 378.

Storage controller 312 is fully populated with instruction processor 314, instruction processor 316, input/output processor 318, input/output processor 320, main memory module 322 and main memory module 324. Each of instruction processors 314 and 316 (along with similar instruction processors 332, 334, 336, 338, 340, and 342) has internal dedicated cache resources in the form of an instruction cache and an operand cache. These elements, along with the associated data invalidity logic, are described in more detail below. A more general description of the construction and operation of instruction processors 314 and 316 may be found in the above referenced and commonly assigned co-pending U.S. Patent Application which has been incorporated by reference.

Input/output processors 318 and 320, along with main memory modules 322 and 324, may be elements currently available, such as found in the Unisys Model 2200/600 series. Input/output processors 344, 346, 348, 350, 352, and 354 and main memory modules 356, 358, 360, 362, 364, and 366 may be similarly found.

Figure 7:
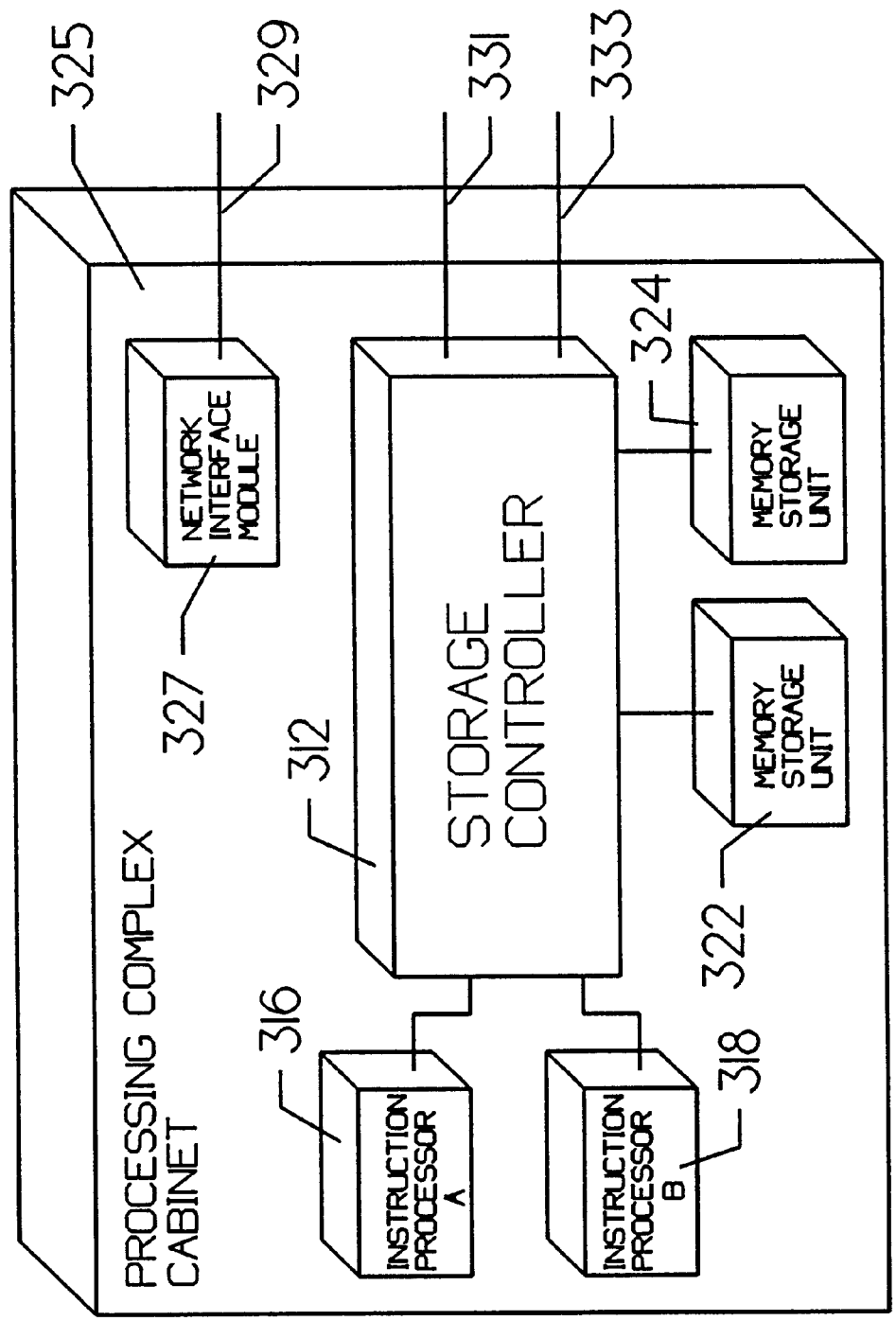
FIG. 7 is a pictorial diagram showing the packaging arrangement of the data processing system of FIG. 6.

FIG. 7 is a schematic diagram showing the packaging of a portion of data processing system 310. A major physical element of data processing system 310 is Processing Complex Cabinet, PCC 325. Within fully populated PCC 325 is located instruction processors 316 and 318 (i.e. IPA and IPB). In the preferred mode, each of these instruction processors is packaged on a single high density circuit board. The memory storage units 322 and 324 are coupled to storage controller 312 as explained above.

Network interface module (i.e. NIM) 327 provide an interface to the operator console via cable 329. Cables 331 and 333 couple input/output units 318 and 320 (see also FIG. 6) to storage controller 312. Input/output units 318 and 320 are physically packaged in an Input/output Complex Cabinet (i.e. ICC) which is not shown for clarity. Other referenced elements are as previously described.

Figure 8:
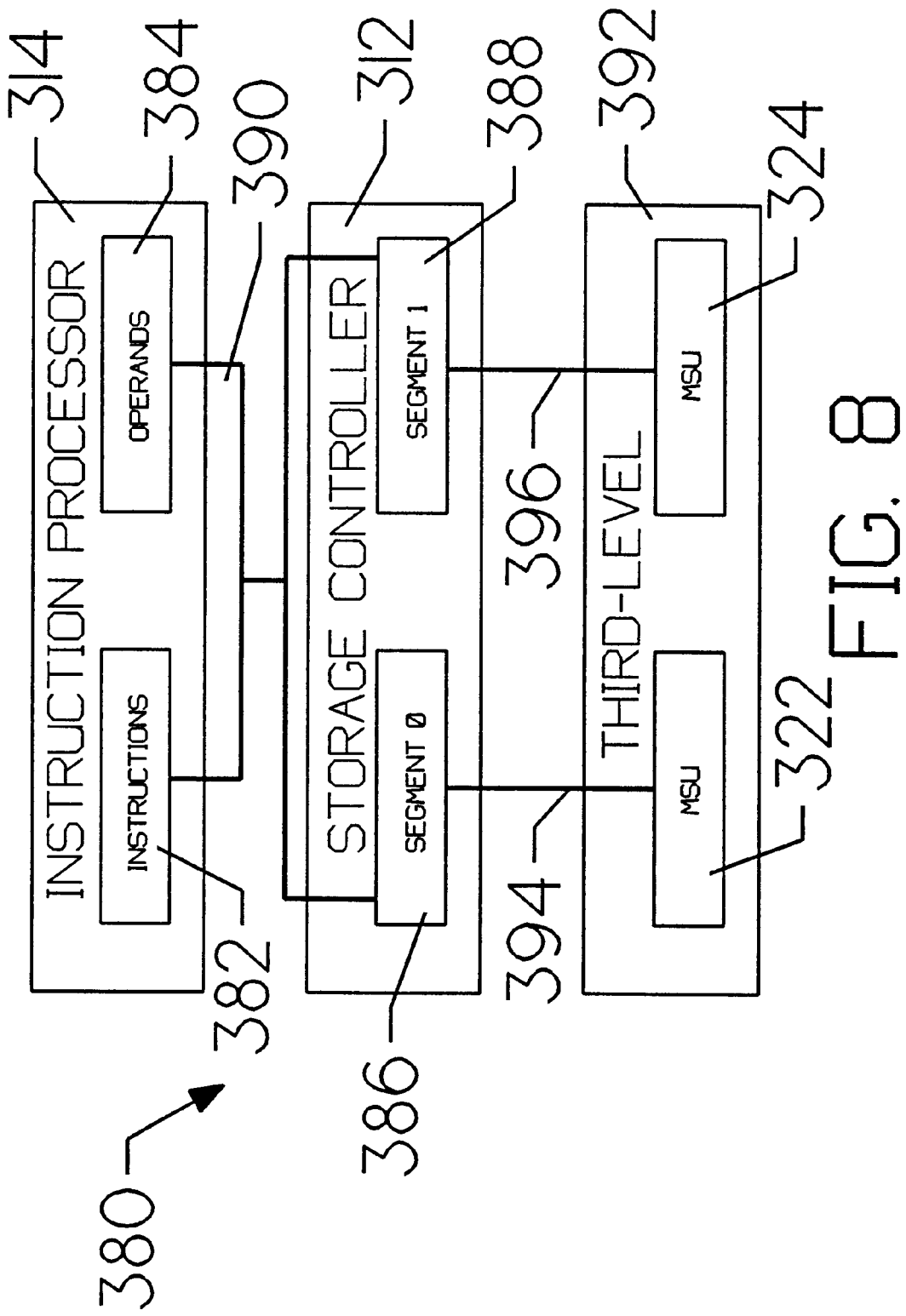
FIG. 8 is a schematic diagram of the levels of storage for a single instruction processor.

FIG. 8 is a flow diagram 380 showing the hierarchical arrangement of the three levels of storage within data processing system 310. Instruction processor 314 contains an instruction cache 382 and an operand cache 384, each storing 8k of 36 bit words. These are internal to instruction processor 314 and dedicated to the operations undertaken therein. By partitioning the internal dedicated cache resources in this manner, there is a certain concurrence of cache accesses associated with normal instruction execution.

Upon the request of instruction processor 314 to access a particular data element as either an instruction or operand, the directory of instruction cache 382 or operand cache 384, respectively, is queried to determine if the required data element is present within the associated cache resource. If the data element is present and valid, the access is completed at that level. If not, access is made to storage controller 312 via interface 390 for the block of eight 36 bit words containing the desired data element. A more detailed explanation of the operation of instruction cache 382 and operand cache 384 is found below.

Storage controller 312 contains an intermediate level cache segment of 128k 36 bit words for each for each main memory module within the cluster. In the present illustration, storage controller 312 contains segment 0 cache 386 and segment 1 cache 388. These cache resources are shared by all users of the main memory within the cluster to include both local and remote users. Any memory request to storage controller 312 is routed to the appropriate directory of segment 0 cache 386 or segment 1 cache 388 to determine if the desired data element is present and valid. This routing is based upon the address requested, since the intermediate cache resources are partitioned in address space to correspond to the associated main memory module.

If present and valid, the requested data element is supplied as an eight word block. If the requested data element is not validly present in segment 0 cache 386 or segment 1 cache 388 (depending upon the requested address), the data is requested from third level storage 392 containing main memory modules 322 and 324 via interfaces 394 and 396, respectively. In the preferred mode, main memory modules 322 and 324 each contain 64 meg. words of storage.

Each data element request to storage controller 312 is made through a separate interface. For a fully populated system, this includes two instruction processors, two input/output processors, and three other storage controllers (see also FIG. 6). Each data element request is divided between segment 0 cache 386 and segment 1 cache 388 based upon requested address. Only if the requested data element is not validly present in the appropriate intermediate level cache resource is an access request made to third level 392.

Figure 9:
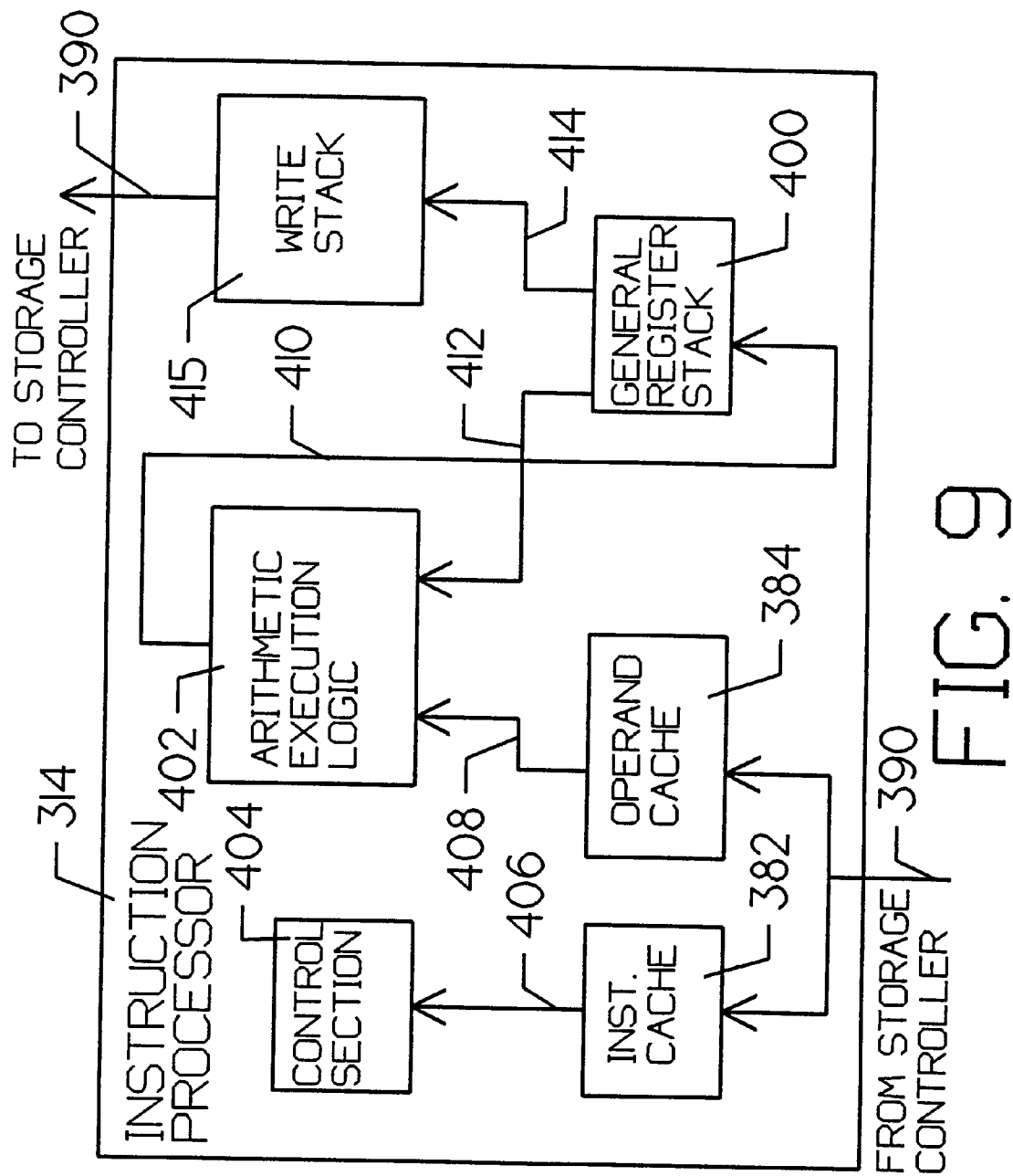
FIG. 9 is a simplified block diagram showing the major elements of the instruction processor.

FIG. 9 is a simplified block diagram of instruction processor 314 showing the major data and control paths. Cable 390, providing the data transfer path between storage controller 312 and instruction processor 314, is actually a two-way path. Data is accessed by storage controller 312 and routed to either instruction cache 382 or operand cache 384 depending upon whether the initial request was for instruction data or operand data. In accordance with usual local cache operation, instruction cache 382 and operand cache 384 temporarily store the data for use by instruction processor 314. Cable 390 also couples write data from write stack 415 to storage controller 312 for longer term storage. Priority for this shared interface is ordinarily given to read data requests requiring write data to be queued in write stack 415. The exception to giving priority to read data is whenever data is to be read from a location for which a write access has been queued.

Instructions from instruction cache 382 are provided via path 406 to control section 404 for decoding via microcode controller and hardwired control logic. Arithmetic execution logic 402 receives operand data via path 408 and performs the specified operation using a combination of microcode control and hardwired control as explained in greater detail below.

Most arithmetic instructions operate upon data which is temporarily stored in general register stack 400. This permits most rapid access to the data, because that data is directly accessed from an extremely fast storage stack. Similarly, arithmetic results are often returned to general register stack 400 for temporary storage until further arithmetic processing. Data is routed to general register stack 400 by path 410. Data from general register stack 400 is routed back to arithmetic execution logic 402 via path 412 and to write stack 415 via path 414. The data transferred to write stack 415 is queued for storage by storage controller 312 as discussed above.

Figure 10:
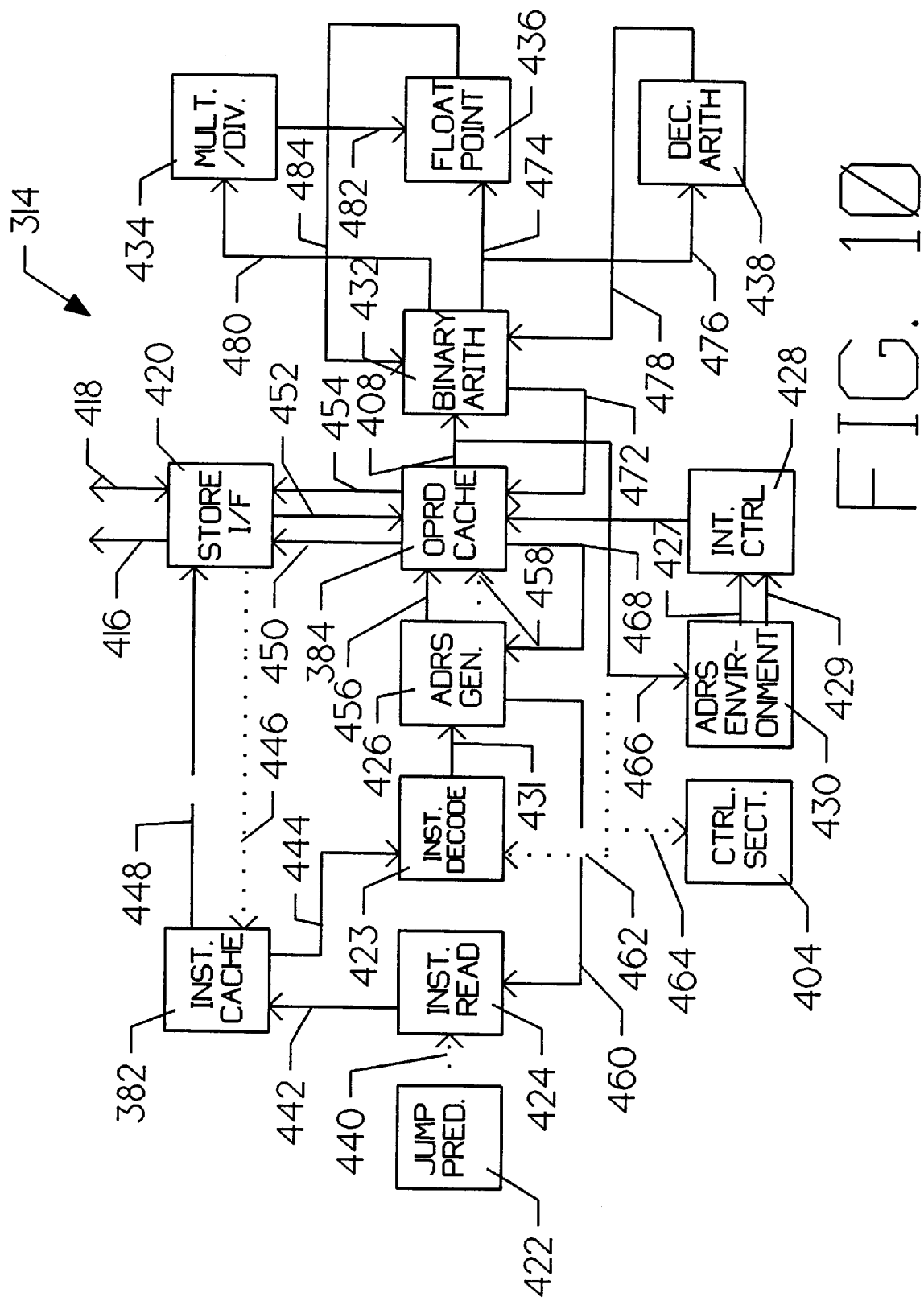
FIG. 10 is a detailed block diagram of the instruction processor.

FIG. 10 is a more detailed block diagram of instruction processor 314. The major data paths are shown, with the solid line paths signifying 72 bit, double word, transfer paths; the dashed line paths signifying addressing paths; and the dotted lines indicating data paths of no greater the 36 bits. Control line paths are not shown for clarity.

The interface to storage controller 312 is via cable 390, as described above. It consists of write cable 416 and read/write cable 418. Each of these data paths couples a 72 bit double word in parallel fashion. The function of write stack 415 (see also FIG. 9) is incorporated within store interface 420 which also provides the request/acknowledge synchronization logic. Addressing information for store interface 420 is sent from instruction cache 382 via cable 448 and operand cache 384 via cable 450 for a corresponding cache miss. Instructions are sent to instruction cache 382 via path 446. Because instructions are 36 bit words, path 446 has a width of 36 bits. Operand data read by storage controller 312 is transferred from store interface 420 to operand cache 384 by path 452. Similarly, write operand data is sent from operand cache 384 to store interface 420 via path 454. Both path 452 and path 454 have a width of 72 bits to accommodate double word operands.

Instructions to be executed are addressed by instruction read 424. The addresses are computed using one of the base registers located within address environment 430 as explained in more detail below. If the instruction is the next sequential instruction, its address is determined by incrementing the program address counter. If the instruction to be executed is addressed by a branch or jump instruction, the address is computed by address generator 426 and supplied via path 460. Alternatively, the address is supplied by jump prediction 422 via path 440 during operation in the jump prediction mode. The address of the next instruction is provided to instruction cache 382 via path 442.

The next addressed instruction is fetched from instruction cache 382 if a match is found. If the request results in a cache miss, storage controller 312 is requested to read the memory block containing the instruction as discussed above. In either case, the instruction is provided to instruction decoder 423 via path 444. The instruction is decoded through the use of a microcode controller by instruction decode 423, and the operand address is computed by address generator 426 from the data received via path 431.

Operand cache 384 contains general register stack 400 (see also FIG. 9). The cache is addressed by the output of address generator 426 received from path 458. Direct operands are received on path 456. If a match is not made in operand cache 384, a read request is made of storage controller 312 through store interface 420 as explained above. If a match is found in operand cache 384 or if the instruction specifies a direct operand received on path 456, the operand data is more immediately produced. In either case, the operand data is routed in accordance with the operation to be performed as specified by the instruction. Indirect operands cause the new operand address to be transferred to address generator 426 via path 468. Operands are transferred to binary arithmetic 432 for mathematical computation via path 408 or to address environment 430 via path 466.

Binary arithmetic 432 provides the basic control for all arithmetic operations to be performed on data received via path 408. Floating point operations are scaled and controlled by floating point logic 436 which receives operand data on path 474. Floating point results are returned to binary arithmetic 432 by path 484. Mult./div. 434 performs the basic multiplication and division operations for fixed point instructions. Operand data is received via path 480 and the products/quotients returned via path 482 and floating point logic 436. Decimal arithmetic 438 receives operand data on path 476 and returns results via path 478. Decimal arithmetic performs special purpose decimal operations.

Another category of instructions involves a change to the base registers within the addressing environment 430. The data is supplied to addressing environment 430 via path 466. Base register contents are supplied to interrupt control 428 via paths 427 and 429. Interrupt control 428 provides the interrupt data to operand cache 384 via path 470. Control section 404 provides the overall microcode control.

The operation of instruction processor 314 is intended to occur in the pipelined mode whenever feasible. The preferred mode utilizes a three stage pipeline. The timing of this pipelined operation may be found below and in U.S. patent application Ser. No. 07/762,276, entitled "Data Coherency Protocol for Multi-Level Cached High Performance Multiprocessor System", referenced co-pending application which has been incorporated herein by reference. The remaining referenced components are as previously discussed.

FIG. 11A is a schematic diagram 500 showing the timing of the basic pipeline operation. Column 502 uniquely identifies the four clock cycles by number, which are used in the present example. Column 504 identifies by clock cycle, the individual instruction (designated A, B, C, and D) controlling the first stage of the pipeline (labeled AGEN), which generates the operand address and controls the microcode branching. Column 506 identifies by clock cycle, the individual instruction controlling the second stage of the pipeline (labeled OPFETCH). Similarly, column 508 identifies which instruction is in control of the third stage of the pipeline (i.e. ARITH).

For instruction A, the instruction decode and operand address generation functions are performed during clock cycle 1. The operand for instruction A is fetched at clock cycle 2. At clock cycle 3, the arithmetic functions of instruction A are performed and results are stored within the GRS as appropriate.

As can be seen in schematic diagram 500, a single instruction (e.g. instruction A) actually requires three clock cycles to complete. However, because each stage of the pipeline operates simultaneously, under ideal conditions, a different instruction completes arithmetic operations (see column 508) each clock cycle. This provides an effective instruction execution rate of one instruction per clock cycle.

To greatly simplify instruction development, the individual instructions (i.e. instructions A, B, C, and D) are each self sufficient. That is each instruction contains enough information to control each stage of the pipeline during the clock cycle in which that instruction is in control. This arrangement is called staged control in that control information note needed for a particular clock cycle is stored or "staged" for the next clock cycle.

Figure 11B:
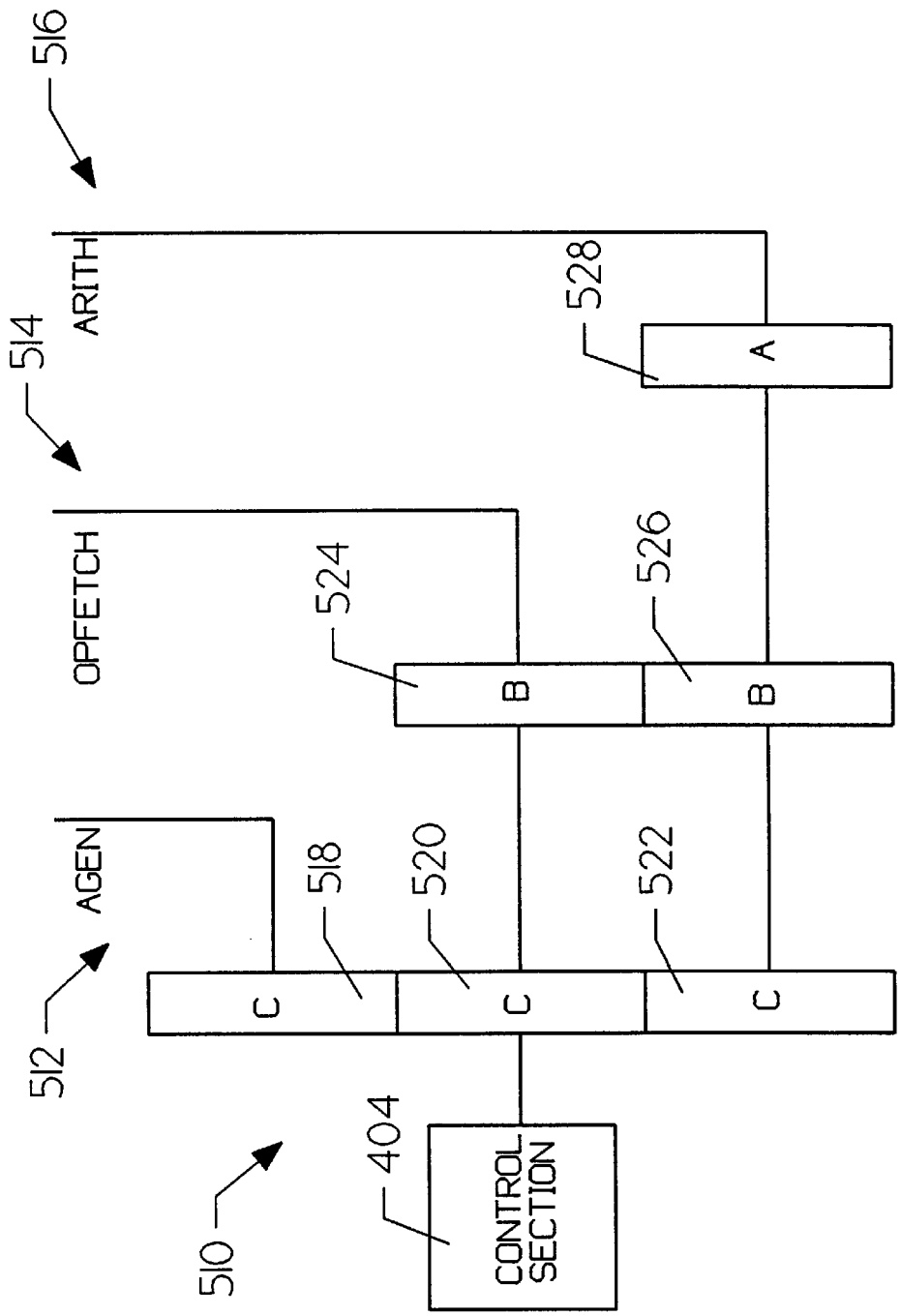
FIG. 11B shows the general control scheme for,the three position pipeline.

FIG. 11B is a schematic diagram 510 showing the control staging for the three stage pipeline of the preferred embodiment. To relate this in time, it corresponds to clock cycle 3 of FIG. 11A. The microcode instructions are supplied by control section 404 (see also FIG. 10). Instruction C contains portion 518, which controls AGEN 512 (i.e. the first stage of the pipeline); portion 520, which controls OPFETCH 514 (i.e. the second stage of the pipeline); and portion 522, which controls ARITH 516 (i.e. the third stage of the pipeline). Note that during clock cycle 3, portion 518 is actually in control of AGEN 512. Portions 520 and 522, on the other hand, are staged or stored for use during later clock cycles.

During clock cycle 3, portion 524 of instruction B is in control of OPFETCH 514 and portion 526 is staged for control of ARITH 516 at a later clock cycle (i.e. probably the next clock cycle). That portion of instruction B which controls AGEN 512 has completed its function during clock cycle 2 and has therefore been discarded.

Portion 528 of instruction A is in control of ARITH 516 during clock cycle 3. The remaining two portions of instruction A have been discarded as their control functions were accomplished during previous clock cycles. At the completion of the arithmetic function specified by portion 528, the resultant may be stored in the GRS as appropriate.

Figure 12:
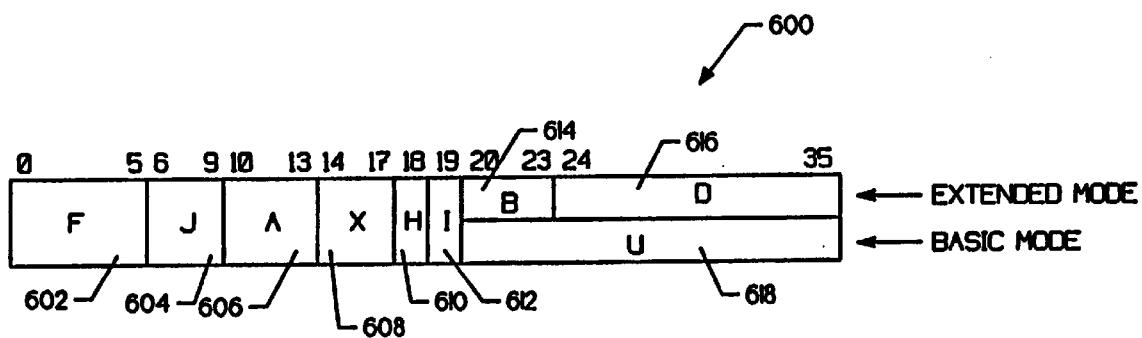
FIG. 12 shows the fields of a typical 36 bit machine instruction in both extended mode and basic mode format.

FIG. 12 shows the field format of a typical 36 bit machine instruction in both extended mode and basic mode format. The diagram is generally shown at 600. The F-field 600 or Function Code, including bits 0 through 5, specifies the operation to be performed by the instruction. The J-field 604, including bits 6 through 9, is sometimes combined with the F-field 600 to act as part of the Function Code, but usually represents an instruction operand qualifier indicating whether the instruction operand is the entire 36-bit word specified by the instruction operand address, a subfield of that word or the instruction operand address itself (immediate operand). The A-field 606, located at bits 10 through 13, is usually the register operand address specifying the address of the register containing the operand. However, for some instructions the A-field 606 acts as part of the Function Code 600. The X-field 608, at bits 14 through 17, is the index register (X-register) address specifying an index register to be used in the indexing operation to form the instruction operand address. The H-bit 610 at bit 18 is used to control index incrementation when the K-field of the instruction is non zero. The I-bit 612 at bit 19 indicates indirect addressing in basic mode unless the instruction specifies an immediate operand.

Generally, the "basic mode" denotes a basic set of machine instructions and capabilities, and "extended mode" denotes a set of machine instructions that includes the basic mode instructions plus a set of additional instructions, thereby providing extended operational capability. In extended mode the I-bit 612 is used either as an extension to the B-field 614 or to indicate whether 18-bit or 24-bit relative addressing will be used. The B-field 614 at bits 20 through 23 in extended mode format is the base register selector which specifies a base register describing the bank containing the instruction operand. The displacement address in extended mode is specified by the D-field 616 (bits 24 through 35) and in basic mode by the U-field 618 (bits 20 through 35). Those fields contain a displacement value that is used in conjunction with the modifier portion of the index register specified by the X-field 608 to form an instruction operand relative address. A further discussion of the instruction format and the operation thereof can be found in the above referenced U.S. patent application Ser. No. 07/762,282, entitled "Cooperative Hardware and Microcode Control System for Pipelined Instruction Execution".

FIG. 13 shows an exemplary base register stack. The diagram is generally shown at 630. The base register stack comprises a number of addressable base registers 632, 634, and 636. In a preferred embodiment, base register stack 630 comprises 15 base registers as shown. During initialization of an applications program, a selected set of base registers are loaded with a number of fields including a base register address field. Each of the base register fields is described in further detail with reference to FIG. 14.

The base register stack 630 is used to allocated memory to each application program running on the data processing system. This is accomplished by using a virtual addressing scheme wherein each base register contains a base address which may be used to calculate an absolute address. A further discussion of absolute address generation may be found in the above referenced U.S. patent application Ser. No. 07/762,282, filed Sep. 19, 1991, entitled "Cooperative Hardware and Microcode Control System for Pipelined Instruction Execution", which is incorporated herein by reference.

FIG. 14 shows the format for one entry 650 in one of the 15 user base registers. Each entry consists of four 36 bit words (i.e. words 658, 660, 662, and 664), wherein each word has lower quarter 652, second quarter 654, and upper half 656. Word 658 has a number of control bits 670 within lower quarter 652 and second quarter 654. Upper half 656 of word 658 contains access lock 668.

Lower limit 666 is located in lower quarter 652 of word 660. Upper limit 672 is located in upper half 656 of word 660. Upper limit 672 and lower limit 666 are used to set the security limits on user program access to the associated data segment.

The base address consists of portion 674 located in upper half 656 of word 662 and portion 676 located in the entire 36 bits of word 664. In this manner, an absolute storage space of $2^{52}$ words of 36 bits each can be uniquely addressed by the absolute address.

Figure 15:
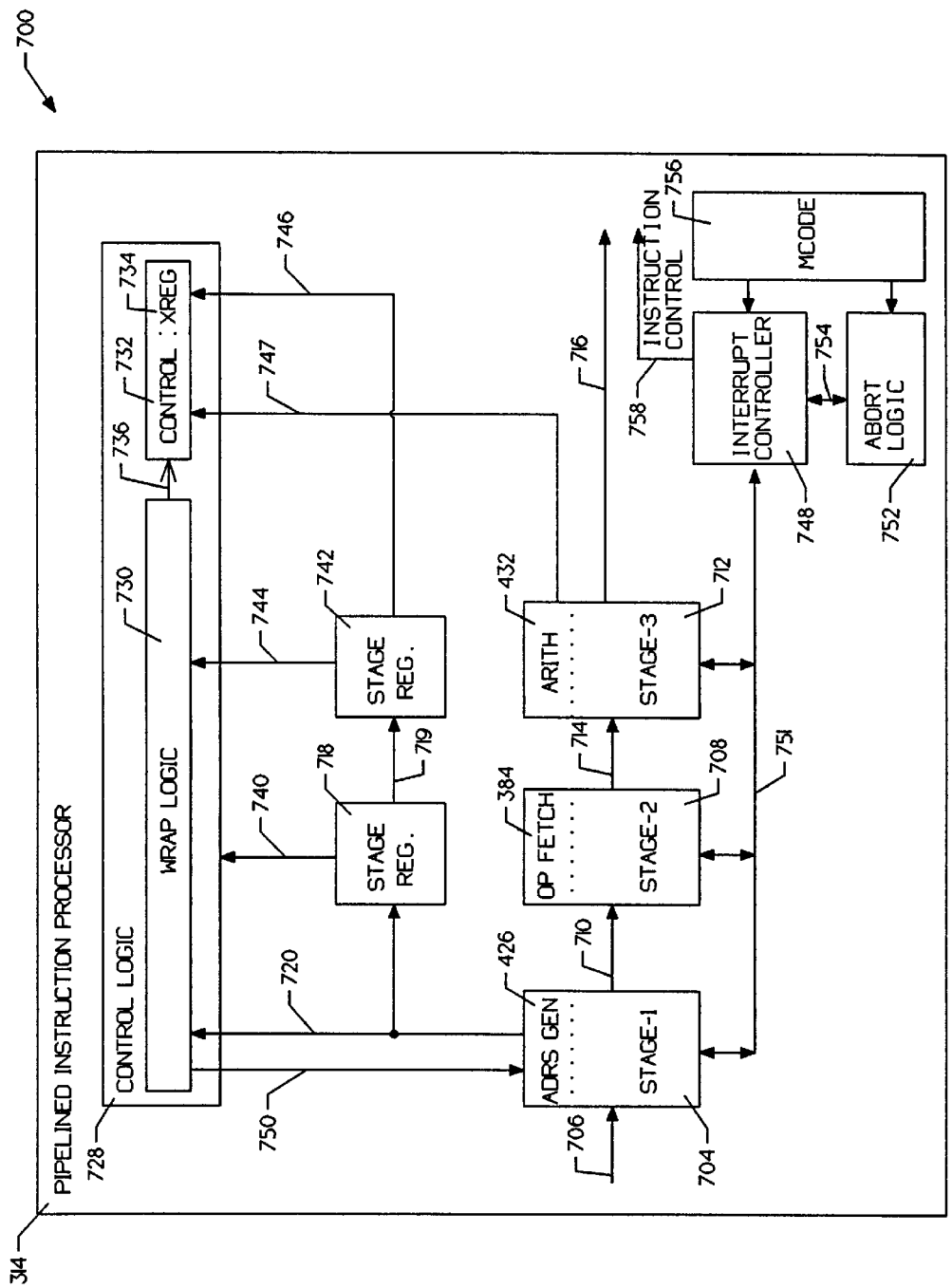
FIG. 15 is a block diagram showing a preferred embodiment of the present invention.

FIG. 15 is a block diagram showing a preferred embodiment of the present invention. The diagram is generally shown at 700. Pipelined instruction processor 314 (see also FIG. 10) may have a number of pipeline stages including a stage-1 704, a stage-2 708, and a stage-3 712. Stage-1 704 includes an operand address generation block ADRS GEN 426 for generating a corresponding operand address. Further, for certain instructions, ADRS GEN 426 may automatically increment the operand address for use by a subsequent instruction. Stage-2 708 includes an operand fetch block 384 for fetching an operand specified by the operand address provided by ADRS GEN 426 from an operand cache. Stage-3 712 includes a binary arithmetic logic block ARITH 432 for performing binary arithmetic functions using the corresponding operand provided by stage-2 708.

During a first pipeline cycle, a first instruction may be provided from an instruction decode block 423 (see FIG. 10) to stage-1 704 via interface 706. Stage-1 704 may execute at least a portion of the first instruction (see FIG. 11B), and may provide a first architectural state change value.

In a preferred embodiment, ADRS GEN 426 may perform address generation for an operand requested by a corresponding instruction. The operand may be referenced via a relative operand address wherein the instruction may directly or indirectly provide a base register address, an index register address, and a U-field during the first pipeline cycle. The base register address corresponds to a location within base register 630 and the index register address corresponds to a location within an index (X) register 734. The corresponding base value and the corresponding X value may be added to the U field to form a corresponding absolute operand address, which may be used during the second pipeline cycle to fetch the corresponding operand from an operand cache memory. A further discussion of absolute address generation may be found in the above referenced U.S. patent application Ser. No. 07/762,282, filed Sep. 19, 1991, entitled "Cooperative Hardware and Microcode Control System for Pipelined Instruction Execution", which is incorporated herein by reference.

As indicated above, during predetermined instructions, ADRS GEN 426 may increment the corresponding index (X) register value during operand address generation. Thus, in the preferred embodiment, it is contemplated that a result of the first instruction may be an first incremented index (X) value, as described above. In a preferred embodiment, it is the writing of this incremented index (X) value to the index register that may be delayed by the staging registers 718 and 742.

During a second pipeline cycle, the first instruction may be provided to stage-2 708, and the first incremented index value may be provided to a first staging register 718 via interface 720. The operand fetch block 384 may fetch the operand located at the absolute address generated by ADRS GEN 426 from an operand cache memory. At the same time, a second instruction may be provided to stage-1 704 via interface 706, wherein stage-1 704 may execute at least a portion of the second instruction and may provide a second operand address and a second incremented index value.

During a third pipeline cycle, the first instruction may be provided to stage-3 712 via interface 714, and the corresponding first incremented index value may be provided to a second staging register 742 via interface 719. ARITH block 432 may perform a corresponding arithmetic operation using the operand fetched by the operand fetch block 384. This arithmetic operation is controlled by the first instruction. Similarly, the second instruction may be provided to stage-2 708 via interface 710 wherein the operand fetch block 384 may fetch a corresponding operand from the operand cache memory. Further, the second incremented index value may be provided to the first staging register 718 via interface 720. Finally, a third instruction may be provided to stage-1 704, resulting in a third operand address and a third incremented index value.

During a fourth pipeline cycle, ARITH 432 of stage-3 712 may selectively provide an abort signal to control block 732 via interface 747. Further, the second staging register 742 may provide the first incremented index value to index register 734 via interface 746. Index register 734 may comprise an architectural state register, and may be part of the General Register Stack 400 (see FIG. 9). Control block 732 may control whether the first incremented index value provided by the second staging register 742 is actually written to index register 734, thereby changing the architectural state of the data processing system.

It is contemplated that wrap logic block 730 may receive signals from stage-1 704 via interface 720 and may provide a selected incremented index value to stage-1 704 via interface 750. Further, wrap logic block 730 may access the incremented index values that are stored in staging registers 718 and 742 via interfaces 740 and 744, respectively. In this configuration, wrap logic block 730 may selectively provide the incremented index values stored in staging registers 718 and 742 to stage-1 704, via interface 750. This may be beneficial if a subsequent instruction requires access to any of the incremented index values provided by the previously executed instructions.

In accordance with the present invention, sequential execution of a branch instruction and a subsequent instruction may be simplified, particularly when the subsequent instruction may change the architectural state of the data processing system. For example, rather than allowing the subsequent instruction to write a corresponding incremented index value to the index register 734 during the first or second pipeline cycles, the incremented index value of the subsequent instruction may be temporarily stored in staging registers 718 and 742, as described above. The writing of the incremented index value may be delayed in this manner until it is determined if the condition of the branch instruction is satisfied.

Referring specifically to FIG. 15, and assuming the first instruction is a conditional branch instruction, the satisfaction of the condition of the conditional branch instruction may be determined by the ARITH block 432 of stage-3 712. If the condition of the branch condition is satisfied, thereby indicating that the subsequent instruction should be aborted, an abort signal may be provided to control block 732 via interface 747. During the next pipeline cycle, control block 732 may disable index register 734 to discard the corresponding incremented index value. If, however, the condition of the branch instruction is not satisfied, stage-3 712 may not provide the abort signal and control block 732 may enable index register 734 such that the corresponding incremented index value stored in the second staging register 742 is written to index register 734. As can readily be seen, the present invention does not require the instruction processor to slip or depipe when a conditional branch instruction is executed.

In addition to the above, it is contemplated that instruction processor 314 may include an interrupt controller 748, abort logic 752, and a ucode block 756. Interrupt controller 748 may be coupled to pipeline stages 704, 708, and 712 via interface 751. Any of the pipeline stages 704, 708 and 712 may provide an interrupt condition to interrupt controller 748 via interface 751. Interrupt controller 748 may also provide an instruction control signal to an instruction sequencer (not shown) via interface 758 to control the sequence of the instructions provided to stage-1 704.

Abort logic 752 may be coupled to interrupt controller 748 via interface 754. Abort logic 752 may determine which, if any, of the instructions within the instruction pipeline to abort when the interrupt controller 748 receives an fault or interrupt condition signal. It is contemplated that both interrupt controller 748 and abort logic 752 may be controlled by microcode stored in ucode 756.

In an exemplary application, and as indicated above, a Load A with address incrementation instruction may cause ARITH 426 to generate an operand address and may then increment the operand address during the first pipeline stage 704. This may allow the incremented operand address to be used during address generation of a next succeeding instruction. However, a corresponding fault or interrupt condition may not be determined until the third pipeline stage-3 712 (i.e. by ARITH 432) of the instruction pipeline. For example, the Load A instruction may perform an address limits check to ensure the address generated for the corresponding operand is within a predefined address space. This address limits check may be performed by ARITH 432. If the address of the operand is not within the assigned address space, an address limits fault may be provided by ARITH 432 of stage-3 712 to interrupt controller 748 via interface 751. Accordingly, it is evident that the load A with address incrementation instruction may provide an architectural state change before the corresponding limits check fault is provided to interrupt controller 748.

In accordance with the present invention, the writing of the incremented index value may be delayed via staging registers 718 and 742 until the corresponding limits check fault is determined. If a fault is detected, ARITH 432 of stage-3 712 may provide an abort signal to control block 732 via interface 747. Control block 732 may disable index register 734 to discard the corresponding incremented index value. If a fault is not detected, ARITH 432 of stage-3 712 may not provide an abort signal to control block 732, and control block 732 may permit the corresponding incremented index value to be written to index register 734, thereby effecting such architectural state change. Further, interrupt controller 748 and abort logic 752 may abort the execution of any or all instructions in the instruction pipeline.

Figure 16:
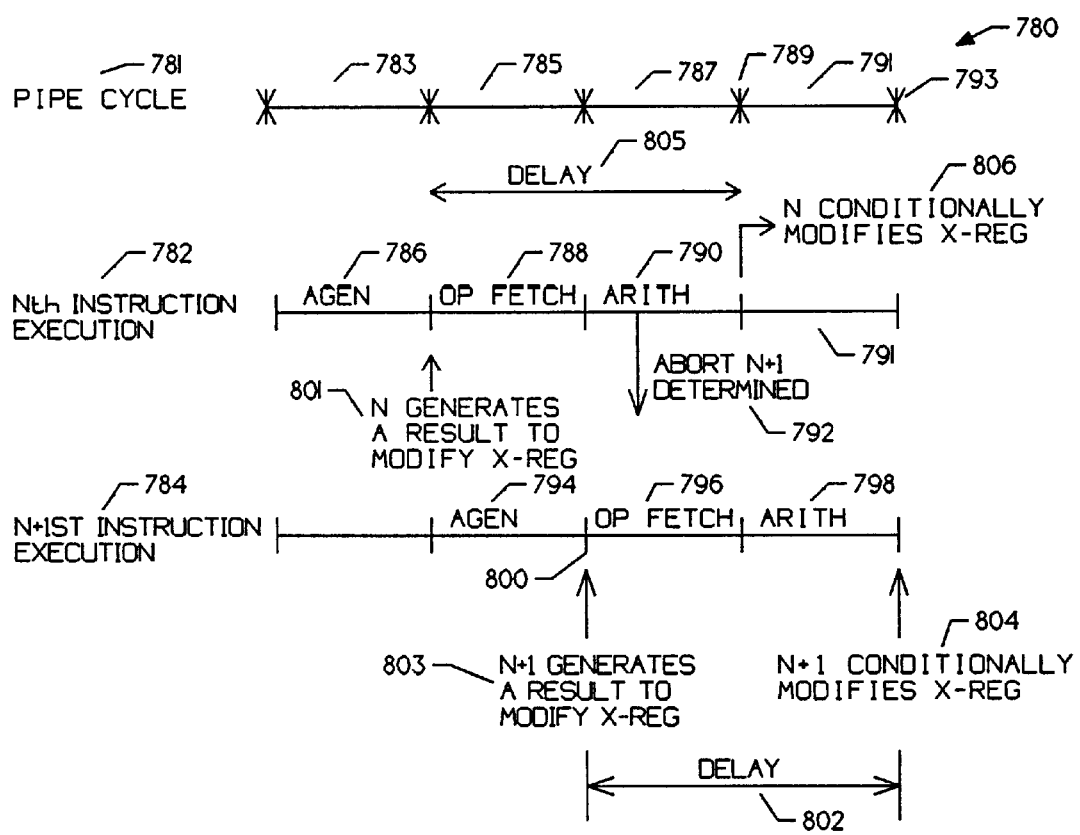
FIG. 16 is a timing diagram showing an exemplary operation of the preferred embodiment of FIG. 15.

FIG. 16 is a timing diagram showing an exemplary operation of the preferred embodiment of FIG. 15. The diagram is generally shown at 780. A number of pipelined cycles are shown at 781 including a first pipeline cycle 783, a second pipeline cycle 785, a third pipeline cycle 787, and a fourth pipeline cycle 791.

During the first pipeline cycle 783, an Nth instruction 782 is clocked into stage-1 704 (see FIG. 15), wherein an absolute operand address may be calculated as shown at AGEN 786. Further, the Nth instruction may provide a first architectural state change as shown at 801. In a preferred embodiment, the architectural state change is an incremented index value as described above.

During the second pipeline cycle 785, the Nth instruction 782 is provided to stage-2 708, wherein the corresponding operand is fetched as shown at 788. Further, the first architectural state change may be provided to the first staging register 718. Also during the second pipeline cycle 785, an N+1 instruction 784 may be clocked into stage-1 704, wherein an absolute operand address is calculated as shown at AGEN 794. Finally, the N+1 instruction may provide a second architectural state change as shown at 803, which in a preferred mode, is an incremented index value.

During the third pipeline cycle 787, the Nth instruction 782 is provided to stage-3 712, wherein an arithmetic operation may be performed using the operand that was fetched during the second pipeline cycle 785. Further, the first architectural state change may be provided to the second staging register 742. Also during the third pipeline cycle, the second instruction may be provided to stage-2 708, wherein the corresponding operand is fetched as shown at 796. At time 789, the first architectural state change may be conditionally written to index register 734 to affect such architectural state change. Thus, the writing of the first architectural state change to the index register 734 is delayed as shown at 805.

If the Nth instruction 782 is a conditional branch instruction, the condition of the conditional branch instruction may be determined during the arithmetic operation of the first instruction, as shown at 790. If the condition of the conditional branch instruction is satisfied, thereby indicating that the N+1 instruction 784 must be aborted, the conditional branch instruction may provide an abort N+1 signal 792 during the third pipeline cycle 787, as shown.

During the fourth pipeline cycle 791, the N+1 instruction 784 is provided to stage-3 712, wherein an arithmetic operation may be performed using the operand that was fetched during the third pipeline cycle 787. At time 793, the N+1 instruction 784 may selectively provide the second architectural state change to index register 734, as shown at 804. Thus, the writing of the second architectural state change to the index register 734 is delayed as shown at 802.

If the Nth instruction did not provide an abort N+1 signal 792, control block 732 may allow the second architectural state change to be written to index register 734, thereby affecting the second architectural state change. If, however, the Nth instruction 784 did provide an abort N+1 signal 792 during the third pipeline cycle 787, control block 732 may prevent the second architectural state change from being written to index register 734, thereby discarding the corresponding architectural state change. As can readily be seen, the N+1 instruction 784 need not be slipped or depiped when following a conditional branch instruction.

Referring back to the third pipeline cycle 787, if the first instruction provides a fault or interrupt condition at 792, rather than an abort N+1 signal 792 as described above, control block 732 may prevent the first architectural state change from being written to index register 734, thereby discarding the first architectural state change. This is possible because the first architectural state change is not conditionally written to index register 734 until time 789 as shown at 806, which is after the fault or interrupt condition is determined. Thus, sufficient time may exist to prevent the first architectural state change from being written to index register 734. Further, abort logic 208 may abort the first instruction and all appropriate subsequent instructions during the third pipeline cycle 787. As can readily be seen, the architectural state is either written or discarded, and thus no complex architectural state restore algorithms are required.

Figure 17:
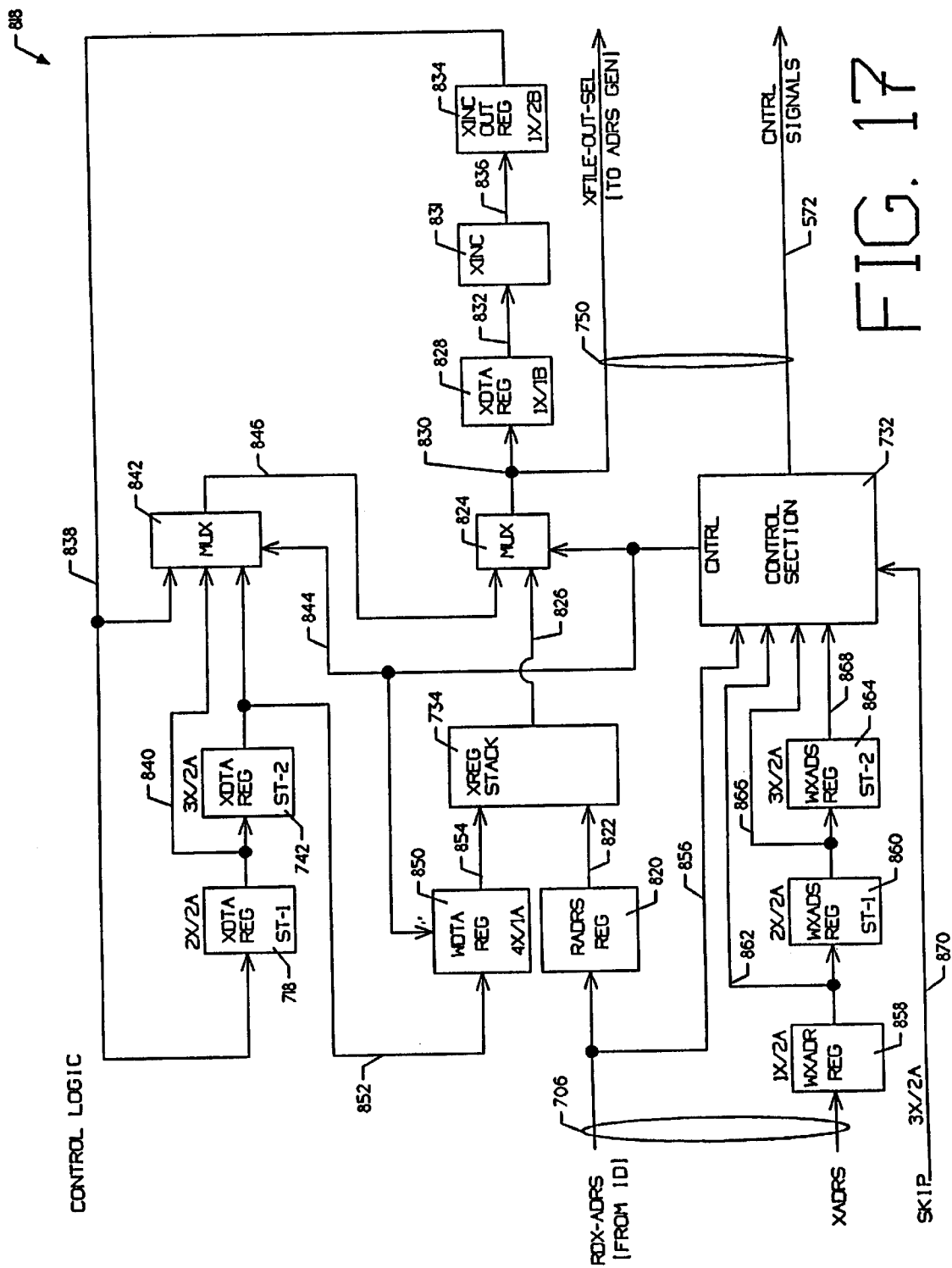
FIG. 17 is a schematic diagram showing the contents of the wrap logic block and staging registers of FIG. 15.

FIG. 17 is a schematic diagram showing the wrap logic block and staging registers of FIG. 15. The diagram is generally shown at 818. As indicated above, it is contemplated that the first stage of the pipelined instruction processor may perform address generation for a requested operand. The operand may be referenced via a relative operand address wherein the second instruction may directly or indirectly provide a base register address, an index register address, and a U-field during the first pipeline cycle. The base register address corresponds to a location within a base register and the index register address corresponds to a location within an index (X) register stack. The corresponding base value and the corresponding X value may be added to the U field to form a corresponding absolute operand address, which may be used during the second pipeline cycle to fetch the corresponding operand from an operand cache memory. A further discussion of absolute address generation may be found in the above referenced U.S. patent application Ser. No. 07/762,282, filed Sep. 19, 1991, entitled "Cooperative Hardware and Microcode Control System for Pipelined Instruction Execution", which is incorporated herein by reference.

Referring specifically to FIG. 17, an index (X) register stack 734 may be provided wherein the index register stack may include a number of index registers. An index address may be provided via the X field of a corresponding instruction (see FIG. 12) to select the desired one of the number of index register.

To read a selected index register, an index address is provided by the instruction decode block 423 (see FIG. 10). The index address is then provided to an address register 820 via interface 706. The index address selects one of the number of index registers of the index register stack 734. The index register stack 734 then reads the selected index register and provides the corresponding index register value stored therein to multiplexer 824 via interface 826. Control logic 732 controls multiplexer 824 via interface 846 and, during an index register read operation, may select the output of the index register stack 734.

Multiplexer 824 provides the index register value to the ADRS GEN block 426 (see FIG. 15 and FIG. 18) and to index data register 828 via interface 830. A further discussion of absolute address generation is provide below with reference to FIG. 18.

The index register value is clocked into the index data register 828 during the "1B" quarter cycle of the first pipeline cycle. This is indicated by the "1X/2B" designation on the index data register 828. A further discussion of the quarter cycles of each pipeline cycle may be found with reference to FIG. 2. The index register value may then be passed to an address incrementation block 831 via interface 832. For predetermined instructions, the address incrementation block 831 increments the index register value. The incremented index register value is then provided to the index increment out register 834 during the "2B" quarter cycle of the first pipeline cycle as shown.

The incremented index register value is then provided to the first staging register 718 via interface 838. The first staging register is also shown in FIG. 15. The incremented index register value is clocked into the first staging register 718 during the "2A" quarter cycle of the second pipeline cycle as shown. The incremented index register value is also provided to multiplexer 842 via interface 838.

During the "2A" quarter cycle of the third pipeline cycle, the incremented index register value is provided to the second staging register 742, and multiplexer 842 via interface 840. The second staging register is also shown in FIG. 15. The incremented index value is then provided to multiplexer 842 and write data register 850 via interface 852. The incremented index register value may be written to write data register 850 during the "1A" quarter cycle of the fourth pipeline cycle as shown. The incremented index register value may then be written to the index register stack during the "1B" quarter cycle of the fourth pipeline cycle.

As indicated above, the third pipeline stage of the pipelined instruction processor of FIG. 15 determines if the incremented index register value should be written to the index register stack 734, or discarded. Because the incremented index register value is not written until the fourth pipeline cycle, as described above, the instruction pipeline is given enough time to make this determination.

During operation, the instruction decode block 423 provides an index register address to control logic 818 during each pipeline cycle. Thus, during each pipeline cycle, an index register value is provided to the address generation block 426 via interface 830. Further, incremented index register values are sequentially provided to the first staging register 718 and the second staging register 742. Finally, incremented index register values are sequentially provided to write data register 850, and conditionally written to the index register stack 734.

It is contemplated that any of the incremented index register values stored in the staging register 718 and 742 or the index increment out register 834, may be provided to the address generation block 426. This may be desirable because a particular index register may be read during a first pipeline cycle, but may not be updated until a fourth pipeline cycle. During the interim period, the updated index register value may be stored in the first staging register 718, the second staging register 742 or the index increment out register 834. Accordingly, if a subsequent instruction desires access to one of these index registers, the updated value must be provided.

To accommodate this situation, control logic 818 has control section 732 which controls the operation of multiplexer 842, multiplexer 824, and write data register 850. The index register address for each of the instructions is sequentially stored in index address registers 858, 860, and 864. Each of the index register addresses stored in index address registers 858, 860, and 864 is provided to control section 732 via interfaces 862, 866, and 868, respectively. The current index register address is also provided to control section 732 via interface 856. Control section 732 may compare the current index register address with the previous three index register addresses to determine if the current instruction is requesting access to an index register that has not yet been updated.

If the current index register address matches one of the previous three index register addresses, control section 732 directs multiplexer 842 and multiplexer 824 to select the appropriate index register value. For example, if the current index register address matches the index register addresses stored in index address register 864, control section 732 may direct multiplexer 842 to select the output of staging register 742. Further, control section 732 may direct multiplexer 824 to select the output of multiplexer 842. This may allow the updated index register value to be provided to the address generation block 426 via interface 830 for the current instruction.

Control section 732 may also receive a skip or abort signal via interface 870. The skip or abort signal may be received during the "2A" quarter cycle of the third pipeline cycle. As indicated above, typically the third pipeline stage may determine if a skip or abort condition is satisfied. If a skip or abort signal is received by control section 732, control section 732 may disable write data register 850, thereby preventing the corresponding incremented index register value from being written to the index register stack 734. If a skip or abort signal is not received by control section 732, control section 732 may enable write data register 850, thereby allowing the corresponding incremented index register value to be written to the index register stack 734. It is contemplated that control section 732 may provide a number of control signal to the first pipeline stage via interface 750 as shown.

Figure 18:
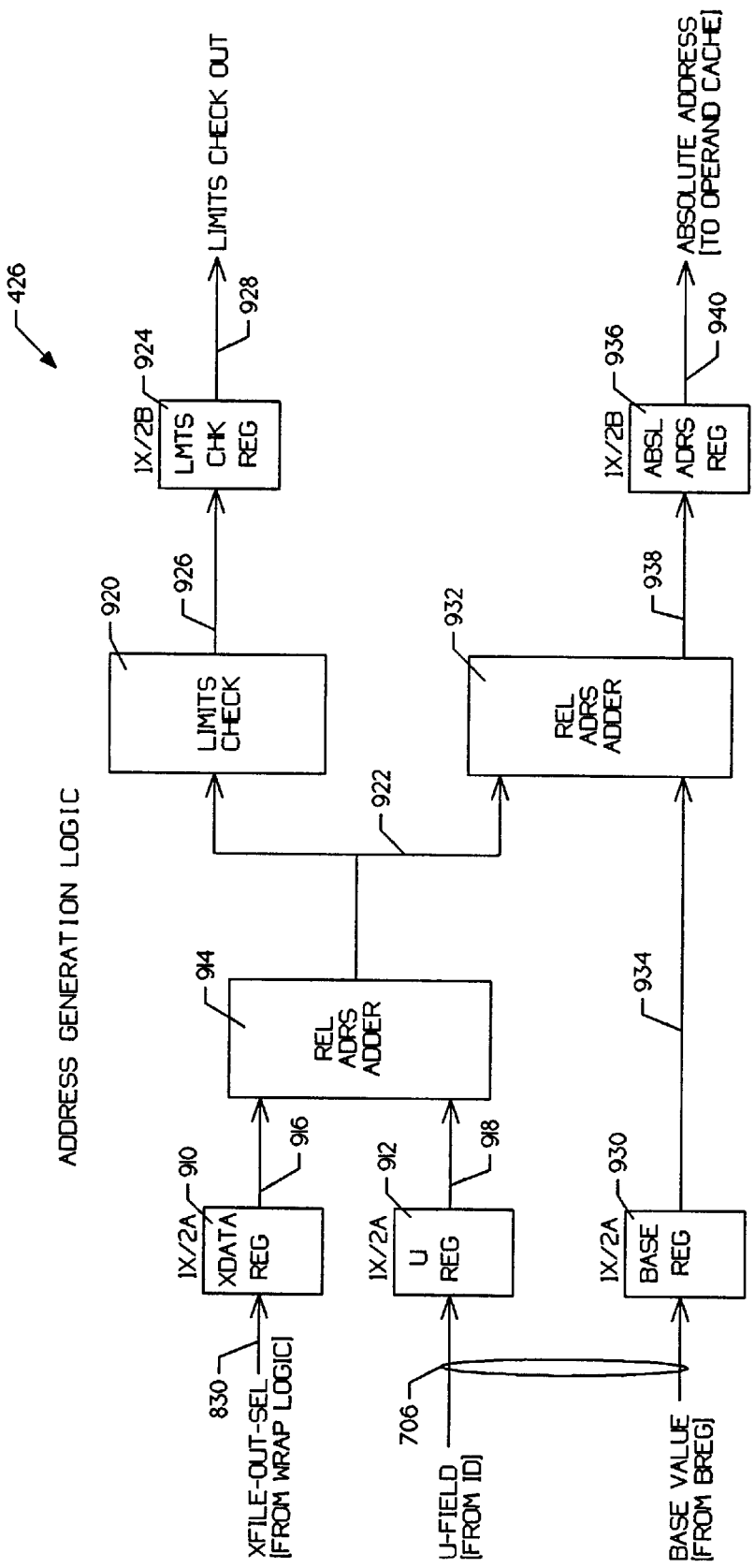
FIG. 18 is a schematic diagram showing the address generation logic block of FIG. 15.

FIG. 18 is a schematic diagram showing the address generation logic block of FIG. 15. The diagram is generally shown at 426. As indicated above, it is contemplated that the first stage of the pipelined instruction processor may perform address generation for a requested operand. The operand may be referenced via a relative operand address wherein the second instruction may directly or indirectly provide a base register address, an index register address, and a U-field during the first pipeline cycle. The base register address corresponds to a location within a base register and the index register address corresponds to a location within an index (X) register stack.

The corresponding base value and the corresponding X value may be added to the U field to form a corresponding absolute operand address, which may be used during the second pipeline cycle to fetch the corresponding operand from an operand cache memory. A further discussion of absolute address generation may be found in the above referenced U.S. patent application Ser. No. 07/762,282, filed Sep. 19, 1991, entitled "Cooperative Hardware and Microcode Control System for Pipelined Instruction Execution", which is incorporated herein by reference.

The index register value is provided to the address generation block 426, as described above with reference to FIG. 17. The index register value is provided to the index data register 910 during the "12A" quarter cycle of the first pipeline cycle as shown. Further, the instruction decode block 423 may provide a U-value to a U-register 918 during the "2A" quarter cycle of the first pipeline cycle as shown. The index register value and the U-value may be provided to a first relative address adder 914 via interfaces 916 and 918, respectively. The first relative address adder 914 may add the index register value and the U-field to provide a memory pointer value on interface 922.

The base register stack 630 (see FIG. 13) may provide a base value to BASE REG 930 via interface 706. The base register value is provided to a second relative address adder 932 via interface 934. Further, the memory pointer is provided to the second relative address adder 932 via interface 922. The second relative address adder may add the base value to the memory pointer value, thereby calculating an absolute operand address.

The absolute operand address may be provided to an absolute address register 936 via interface 938 during the "2B" quarter cycle of the first pipeline cycle as shown. During the second pipeline cycle, the absolute operand address may be provided to the operand cache 384 to fetch the corresponding operand, as described above.

It is contemplated that a limits check block 920 may be provided wherein the limits check block 920 may perform a preliminary address limits check on the memory pointer value. The limits check block 920 may provide a limits check result to a limits check register 924 via interface 926. It is contemplated that limits check block 920 may provide a preliminary address limits check, and that a second address limits check may be performed by the ARITH block 432 of the third pipeline stage 712, as described above.

Figure 19:
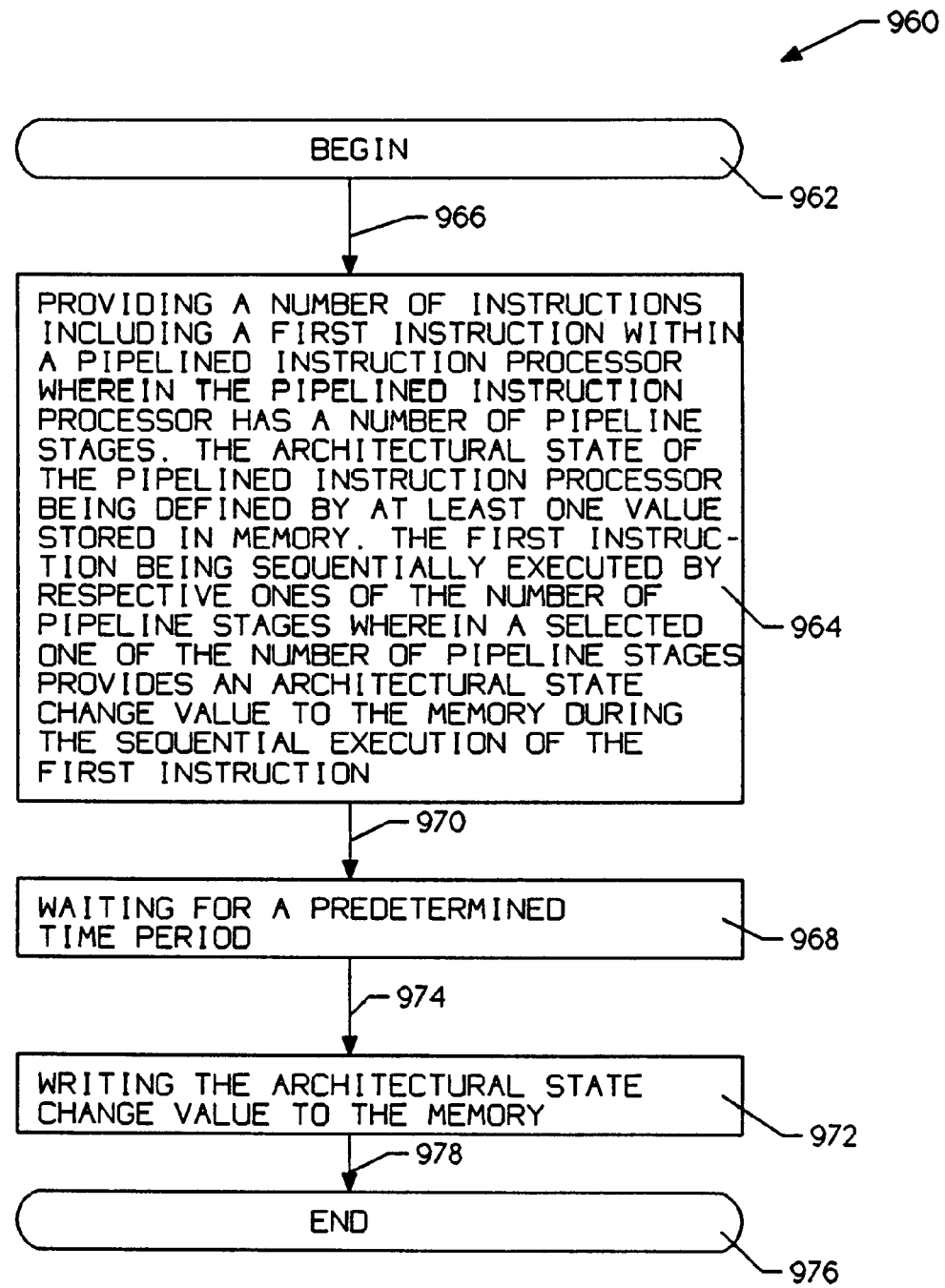
FIG. 19 is a flow diagram showing a first exemplary method of the present invention.

FIG. 19 is a flow diagram showing a first exemplary method of the present invention. The diagram is generally shown at 960. The algorithm is entered at element 962, wherein control is passed to element 964 via interface 966. Element 964 provides a number of instructions, including a first instruction within a pipelined instruction processor, wherein the pipelined instruction processor has a number of pipeline stages. The architectural state of the pipeline instruction processor is defined by at least one value stored in a memory. The first instruction of the number of instructions is sequentially executed by respective ones of the number of pipeline stages, wherein a selected one of the number of pipeline stages provides an architectural state change value to the memory. Control is then passed to element 968 via interface 970. Element 968 waits for a predetermined time period. Control is then passed to element 972 via interface 974. Element 972 writes the architectural state change value to the memory. Control is then passed to element 976 via interface 978, wherein the algorithm is exited.

Figure 20A:
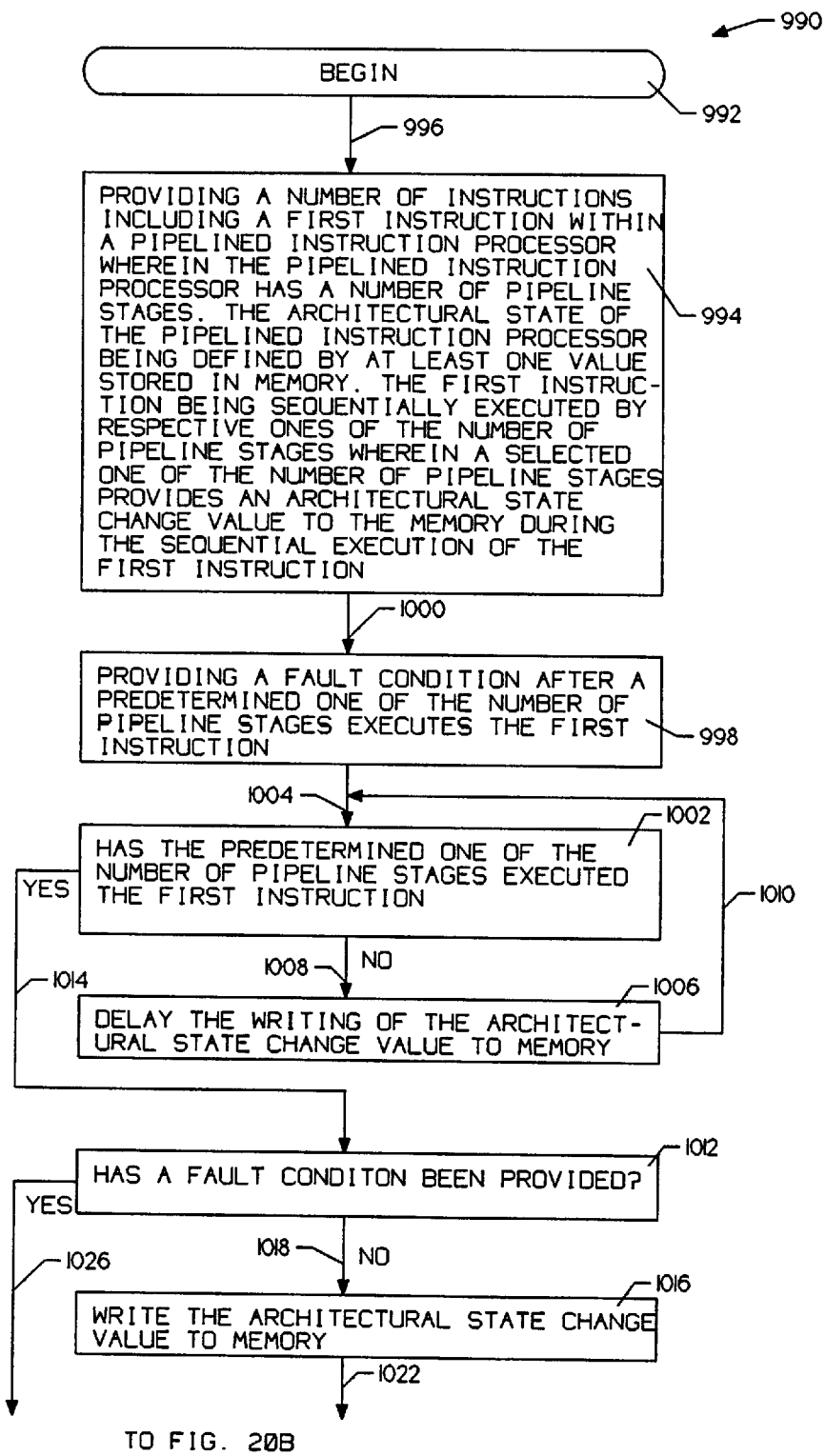
FIG. 20 is a flow diagram showing a second exemplary method of the present invention.
Figure 20B:
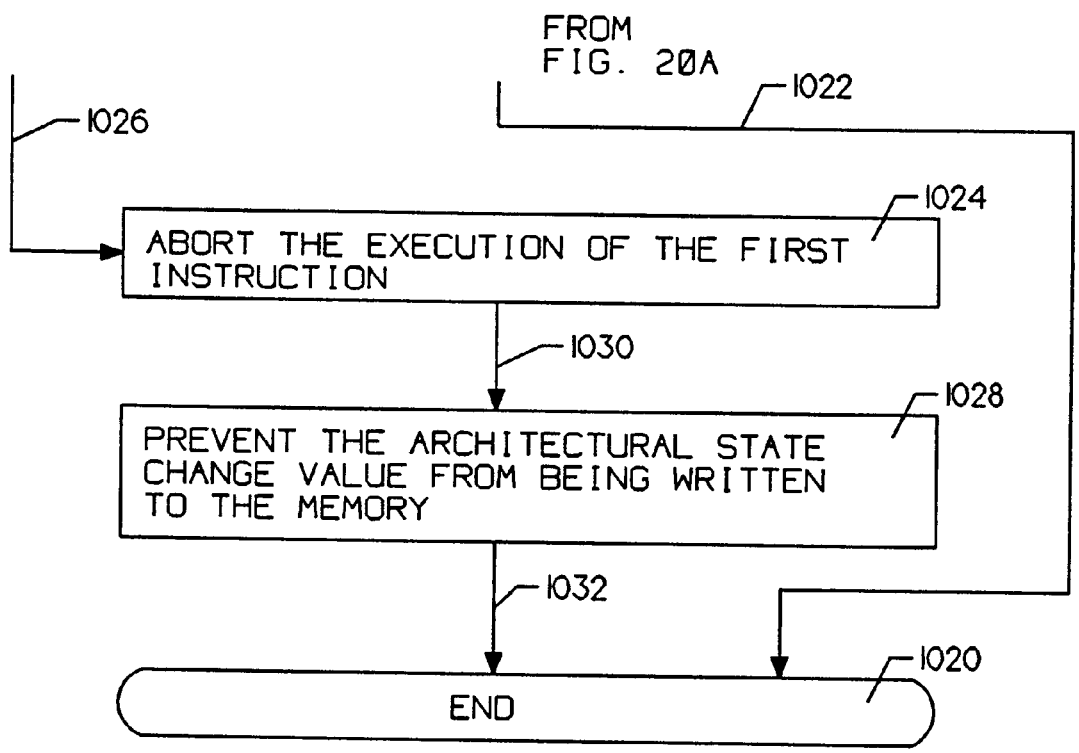

FIGS. 20A and 20B comprise a flow diagram showing a second exemplary method of the present invention. The diagram is generally shown at 990. The algorithm is entered at element 992, wherein control is passed to element 994 via interface 996. Element 994 provides a number of instructions including a first instruction within a pipelined instruction processor, wherein the pipelined instruction processor has a number of pipeline stages. The architectural state of the pipelined instruction processor is defined by at least one value stored in a memory. The first instruction of the number of instructions is sequentially executed by respective ones of the number of pipeline stages, wherein a selected one of the number of pipeline stages provides an architectural state change value to the memory. Control is then passed to element 998 via interface 1000. Element 998 provides a fault condition after a predetermined one of the number of pipeline stages executes the first instruction. Control is then passed to element 1002 via interface 1004. Element 1002 determines whether the predetermined one of the number of pipeline stages has executed the first instruction. If the predetermined one of the number of pipeline stages has not executed the first instruction, control is passed to element 1006 via interface 1008. Element 1006 delays the writing of the architectural state change value to the memory. Control is then passed back to element 1002 via interface 1010.

Referring back to element 1002, if the predetermined one of the number of pipeline stages has executed the first instruction, control is passed to element 1012 via interface 1114. Element 1112 determines whether a fault condition has been provided. If a fault condition has not been provided, control is passed to element 1016 via interface 1018. Element 1016 writes the architectural state change value to the memory. Control is then passed to element 1020 via interface 1022, wherein the algorithm is exited.

Referring back to element 1012, if a fault condition has been provided, control is passed to element 1024 via interface 1026. Element 1024 aborts the execution of the first instruction. Control is then passed to element 1028 via interface 1030. Element 1028 prevents the architectural state change value from being written to the memory. Control is then passed to element 1020 via interface 1032, wherein the algorithm is exited.

Figure 21:
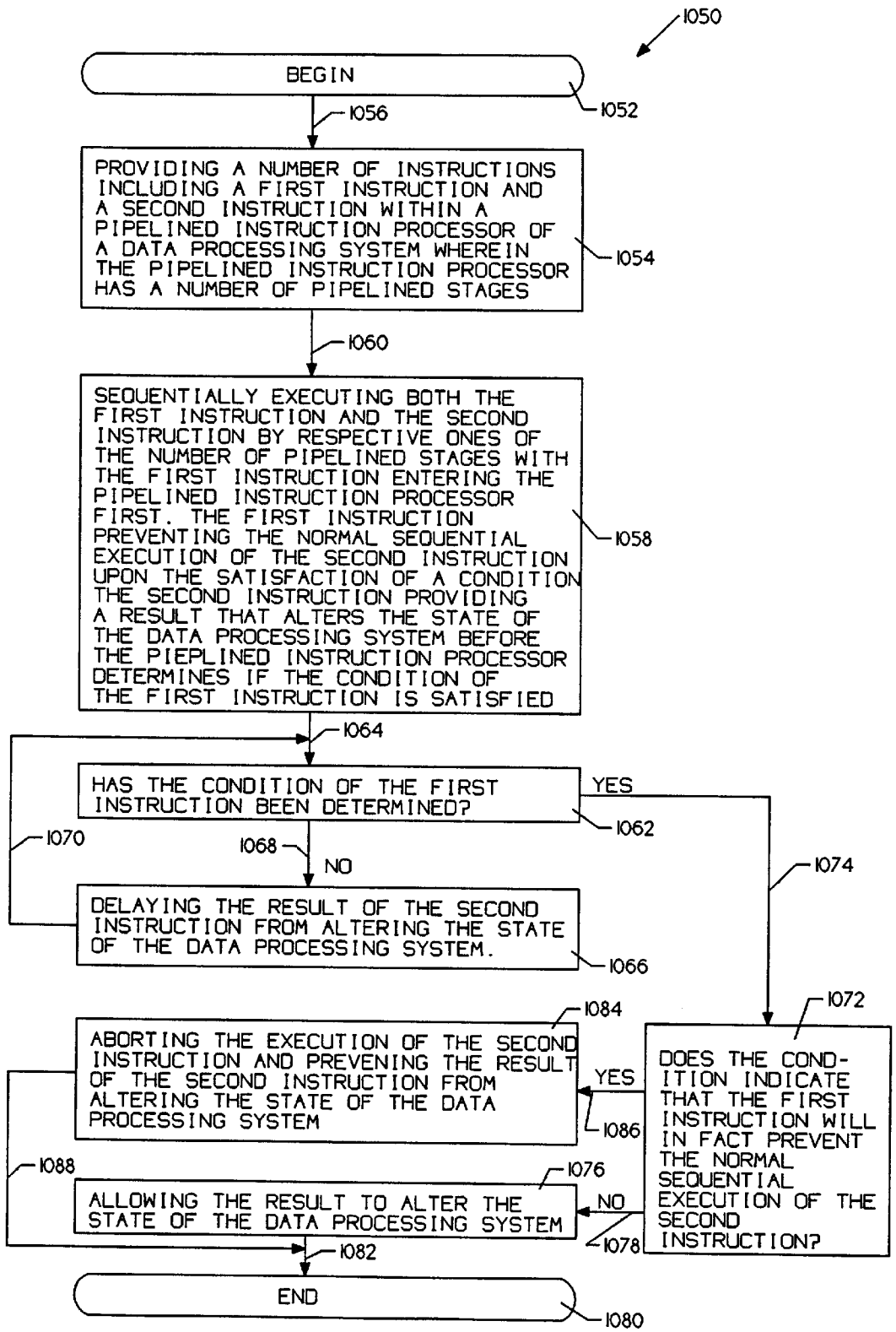
FIG. 21 is a flow diagram showing a third exemplary method of the present invention.

FIG. 21 is a flow diagram showing a third exemplary method of the present invention. The diagram is generally shown at 1050. The algorithm is entered at element 1052, wherein control is passed to element 1054 via interface 1056. Element 1054 provides a number of instructions, including a first instruction and a second instruction within a pipelined instruction processor. The pipelined instruction processor has a number of pipeline stages. Control is then passed to element 1058 via interface 1060. Element 1058 sequentially executes both the first instruction and the second instruction by respective ones of the number of pipeline stages, with the first instruction entering the pipelined instruction processor first. The first instruction prevents the normal sequential execution of the second instruction upon the satisfaction of a condition. The second instruction provides a result that alters the state of the data processing system before the pipeline instruction processor determines if the condition of the first instruction is satisfied. Control is then passed to element 1062 via interface 1064. Element 1062 determines whether the condition of the first instruction has been determined. If the condition of the first instruction has not been determined, control is passed to element 1066 via interface 1068. Element 1066 delays the result of the second instruction from altering the state of the data processing system. Control is then passed back to element 1062 via interface 1070.

Referring back to element 1062, if the condition of the first instruction has been determined, control is passed to element 1072 via interface 1074. Element 1072 determines whether the condition indicates the first instruction will in fact prevent the normal sequential execution of the second instruction. If the condition does not indicate that the first instruction will in fact prevent the normal sequential execution of the second instruction, control is passed to element 1076 via interface 1078. Element 1076 allows the result to alter the state of the data processing system. Control is then passed to element 1080 via interface 1082, wherein the algorithm is exited.

Referring back to element 1072, if the condition does indicate that the first instruction will in fact prevent the normal sequential execution of the second instruction, control is passed to element 1084 via interface 1086. Element 1084 aborts the execution of the second instruction and prevents the result of the second instruction from altering the state of the data processing system. Control is then passed to element 1080 via interface 1088, wherein the algorithm is exited.

Figure 22A:
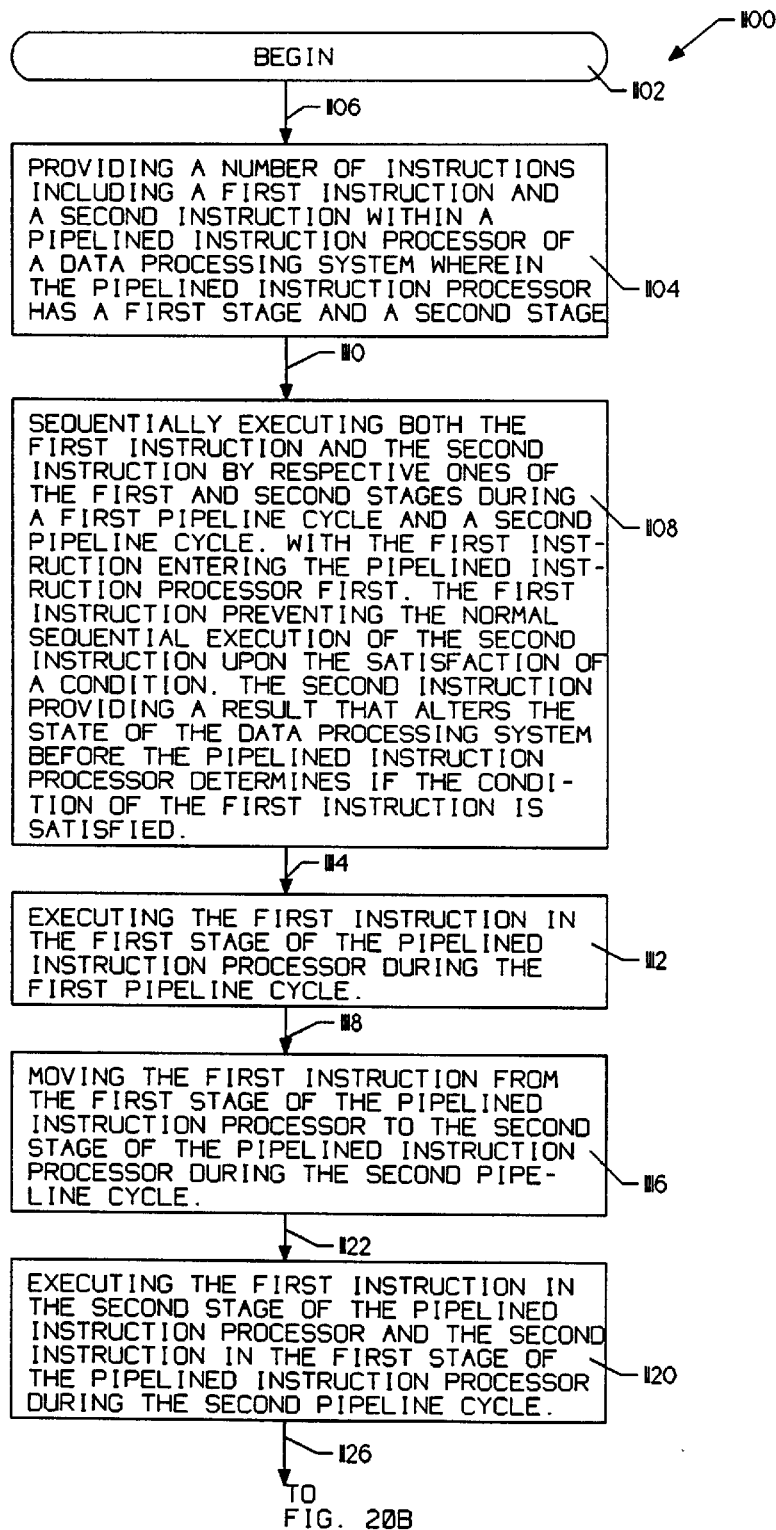
FIG. 22A and FIG. 22B comprise a flow diagram showing a fourth exemplary method of the present invention.
Figure 22B:
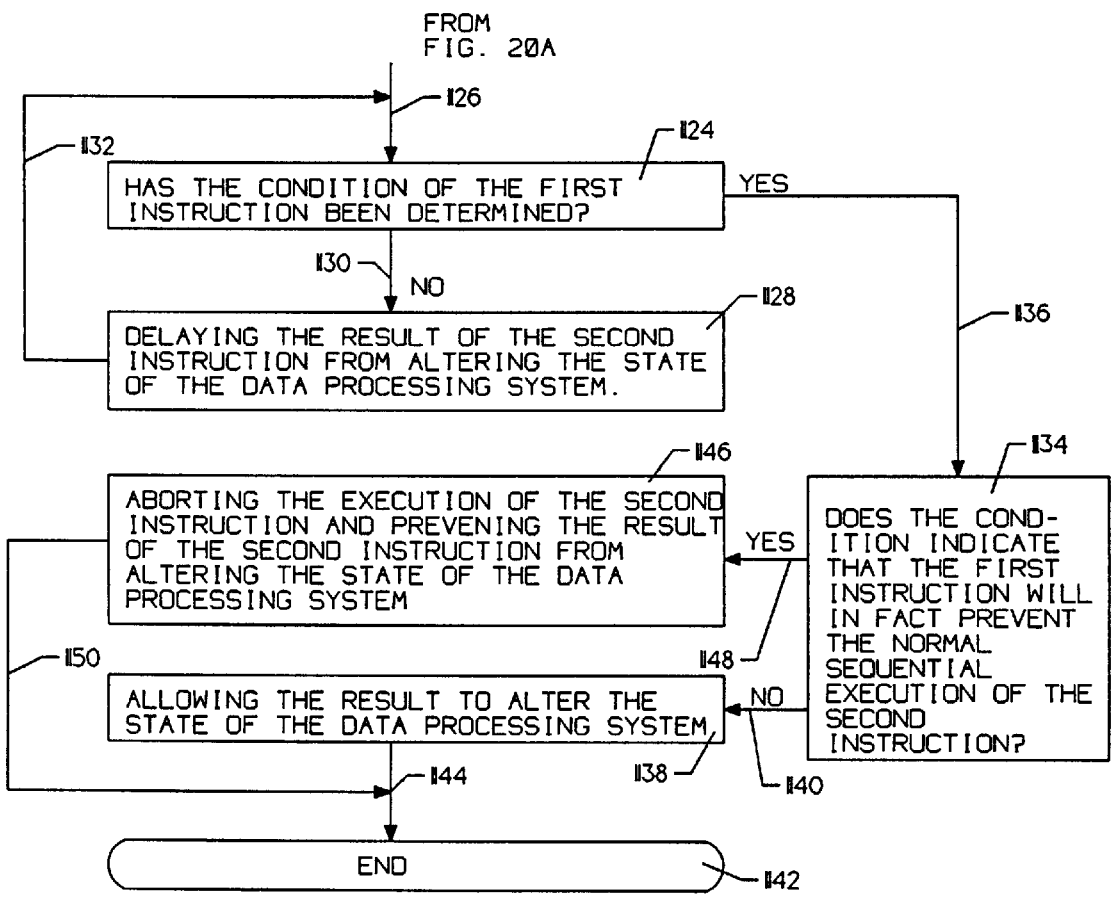

FIGS. 22A and 22B comprise a flow diagram showing a fourth exemplary method of the present invention. The diagram is generally shown at 1100. The algorithm is entered at element 1102, wherein control is passed to element 1104 via interface 1106. Element 1104 provides a number of instructions, including a first instruction and a second instruction within a pipelined instruction processor, wherein the pipelined instruction processor has a first stage and a second stage. Control is then passed to element 1108 via interface 1110. Element 1108 sequentially executes both the first instruction and the second instruction by respective ones of the first and second stages during a first pipeline cycle and a second pipeline cycle, with the first instruction entering the pipelined instruction processor first. The first instruction prevents the normal sequential execution of the second instruction upon the satisfaction of a condition. The second instruction provides a result that alters the state of the data processing system before the pipelined instruction processor determines if the condition of the first instruction is satisfied. Control is then passed to element 1112 via interface 1114. Element 1112 executes the first instruction in the first stage of the pipelined instruction processor during the first pipeline cycle. Control is then passed to element 1116 via interface 1118. Element 1116 moves the first instruction from the first stage of the pipelined instruction processor to the second stage of the pipelined instruction processor during the second pipeline cycle. Control is then passed to element 1120 via interface 1122. Element 1120 executes the first instruction in the second stage of the pipelined instruction processor, and the second instruction in the first stage of the pipelined instruction processor during the second pipeline cycle. Control is then passed to element 1124 via interface 1126. Element 1124 determines whether the condition of the first instruction has been determined. If the condition of the first instruction has not been determined, control is passed to element 1128 via interface 1130. Element 1128 delays the result of the second instruction from altering the state of the data processing system. Control is then passed back to element 1124 via interface 1132.

Referring back to element 1124, if the condition of the first instruction has been determined, control is passed to element 1134 via interface 1136. Element 1134 determines whether the condition indicates that the first instruction will in fact prevent the normal sequential execution of the second instruction. If the condition does not indicate that the first instruction will in fact prevent the normal sequential execution of the second instruction, control is passed to element 1138 via interface 1140. Element 1138 allows the result of the second instruction to alter the state of the data processing system. Control is then passed to element 1142 via interface 1144, wherein the algorithm is exited.

Referring back to element 1134, if the condition does indicate that the first instruction will in fact prevent the normal sequential execution of the second instruction, control is passed to element 1146 via interface 1148. Element 1146 aborts the execution of the second instruction and prevents the result of the second instruction from altering the state of the data processing system. Control is then passed to element 1142 via interface 1150, wherein the algorithm is exited.

Having thus described the preferred embodiments of the present invention, those of skill in the art will readily appreciate that the teachings found herein may be applied to yet other embodiments within the scope of the claims hereto attached.

What is claimed is:

1. A data processing system including a pipelined instruction processor wherein the architectural state of the pipelined instruction processor is defined by at least one value stored in a memory, the pipelined instruction processor executing a number of instructions including a first instruction wherein the pipelined instruction processor has a number of pipeline stages, the first instruction being sequentially executed by respective ones of the number of pipeline stages wherein a selected one of the number of pipeline stages provides an architectural state change value to the memory, comprising:

a. writing means for writing the architectural state change value to the memory; and b. delay means coupled to the selected one of the number of pipeline stages and further coupled to said writing means for delaying said writing means from writing the architectural state change value to the memory for a predetermined time period, said delay means comprising at least one staging means connected in parallel with the instruction pipeline for receiving the architectural state change value from the selected pipeline stage and providing the architectural stage change value to said writing means, said delay means delaying said writing means without interrupting the sequential execution of the first instruction by the respective ones of the number of pipeline stages.

2. A data processing system according to claim 1 wherein the sequential execution of the first instruction is complete after the first instruction is executed by a final one of the number of pipeline stages.

3. A data processing system according to claim 2 further comprising an interrupt controller wherein the interrupt controller selectively provides an instruction interrupt signal to the instruction processor during the sequential execution of the first instruction, said delay means delaying said writing means from writing the architectural state change value to the memory until after execution of the first instruction is complete.

4. A data processing system according to claim 3 wherein said instruction interrupt signal is an instruction fault.

5. A data processing system according to claim 4 wherein said instruction fault is provided by said interrupt controller in response to a failed limits check.

6. A data processing system according to claim 4 further comprising an aborting means coupled to said delay means for aborting execution of the first instruction and preventing said writing means from writing the architectural state change value to the memory if said interrupt controller provides the instruction fault.

7. A data processing system according to claim 1 wherein a second instruction is sequentially executed by respective ones of the number of pipeline stages wherein the second instruction enters the pipelined instruction processor before the first instruction, the second instruction being a conditional branch instruction that prevents the normal sequential execution of the pipelined instruction processor upon the satisfaction of a condition, the satisfaction of the condition being determined by a predetermined one of the number of pipeline stages, said delay means delaying said writing means from writing the architectural state change value to the memory until it is determined whether the condition of the second instruction is satisfied.

8. A data processing system according to claim 7 further comprising an aborting means coupled to said delay means for aborting execution of the first instruction and preventing said writing means from writing the architectural state change value to the memory if the condition of the second instruction is satisfied.

9. A data processing system including a pipelined instruction processor for executing a number of instructions including a first instruction and a second instruction wherein the pipelined instruction processor has a number of pipeline stages, both the first instruction and the second instruction being sequentially executed by respective ones of the number of pipeline stages with the first instruction entering the pipelined instruction processor first, the first instruction preventing the normal sequential execution of the second instruction upon the satisfaction of a condition, the second instruction providing a result that upon normal completion alters the state of the data processing system before the pipelined instruction processor determines if the condition of the first instruction is satisfied, comprising:

a. determining means coupled to the pipelined instruction processor for determining whether the condition of the first instruction is satisfied, thereby determining if the first instruction will in fact prevent the normal sequential execution of the second instruction; and b. delay means coupled to the pipelined instruction processor and said determining means for delaying the result of the second instruction from altering the state of the data processing system until said determining means determines whether the first instruction will in fact prevent the normal sequential execution of the second instruction, said delay means comprising at least one staging means connected in parallel with the instruction pipeline for receiving the result of the second instruction, said delay means delaying the result of the second instruction from altering the state of the data processing system without interrupting the normal sequential execution of the first instruction and the second instruction.

10. A data processing system according to claim 9 wherein the number of pipeline stages includes a first stage, a second stage and a third stage wherein the first instruction is executed by the first stage during a first pipeline cycle, and is executed by the second stage during a second pipeline cycle, and is executed by the third stage during a third pipeline cycle.

11. A data processing system according to claim 10 wherein the second instruction is executed by the first stage during the second pipeline cycle, and is executed by the second stage during the third pipeline cycle, and is executed by the third stage during a fourth pipeline cycle.

12. A data processing system according to claim 11 wherein the second instruction provides the result during the second pipeline cycle and said determining means determines if the condition of the first instruction is satisfied during the third pipeline cycle.

13. A data processing system according to claim 12 wherein said delay means delays the result of the second instruction from altering the state of the data processing system until the fourth pipelined cycle.

14. A data processing system according to claim 13 wherein the first instruction skips the execution of the second instruction upon the satisfaction of the condition.

15. A data processing system according to claim 14 wherein the result of the second instruction is an incremented address that is provided to an indexing register within the pipelined instruction processor.

16. A data processing system according to claim 9 wherein said staging means comprises two or more staging resisters and sequentially stores the result in the two or more staging registers.

17. A data processing system according to claim 16 wherein each of said two or more staging registers corresponds to a predetermined one of the number of pipeline stages.

18. A data processing system according to claim 16 further comprising providing means for providing the result from selected ones of the two or more staging registers to predetermined ones of the number of pipeline stages.

19. A data processing system according to claim 18 wherein said delay means and said providing means comprise a wrap logic block.

20. A data processing system including a pipelined instruction processor for executing a number of instructions including a first instruction and a second instruction wherein the pipelined instruction processor has a first stage and a second stage, both the first instruction and the second instruction being sequentially executed by respective ones of the first and second stages during a first pipeline cycle and a second pipeline cycle, with the first instruction entering the pipelined instruction processor first, the first instruction preventing the normal sequential execution of the second instruction upon the satisfaction of a condition, the second instruction providing a result that upon normal completion alters the state of the data processing system before the pipelined instruction processor determines if the condition of the first instruction is satisfied, comprising:

a. first executing means coupled to the first stage of the pipelined instruction processor for executing the first instruction in the first stage of the pipelined instruction processor during the first pipeline cycle;

b. transferring means coupled to the first stage and the second stage of the pipelined instruction processor for transferring the first instruction from the first stage of the pipelined instruction processor to the second stage of the pipelined instruction processor during the second pipeline cycle;

c. second executing means coupled to the second stage of the pipelined instruction processor for executing the first instruction in the second stage of the pipelined instruction processor, said first executing means executing the second instruction in the first stage of the pipelined instruction processor during the second pipeline cycle;

d. determining means coupled to the pipelined instruction processor for determining whether the condition of the first instruction is satisfied, thereby determining if the first instruction will in fact prevent the normal sequential execution of the second instruction; and e. delay means coupled to the pipelined instruction processor and further coupled to said determining means for delaying the result of the second instruction from altering the state of the data processing system until said determining means determines whether the first instruction will in fact prevent the normal sequential execution of the second instruction, said delay means comprising at least one staging means connected in parallel with the second stage for receiving the result of the second instruction, said delay means delaying the result of the second instruction from altering the state of the data processing system without interrupting the normal sequential execution of the first instruction and the second instruction through the number of pipeline stages.

21. A data processing system according to claim 20 further comprising:

f. aborting means coupled to said determining means and said delay means for aborting the execution of the second instruction and preventing the result of the second instruction from altering the state of the pipelined instruction processor if said determining means determines that the first instruction will in fact prevent the normal sequential execution of the second instruction.

22. A pipelined instruction processor comprising:

a. a first pipeline stage for executing a first instruction during a first pipeline cycle and a second instruction during a second pipeline cycle and a third instruction during a third pipeline cycle, said first pipeline stage using an indexing address to generate an operand address, and providing a new incremented indexing address;

b. a second pipeline stage coupled to said first pipeline stage for executing the first instruction during the second pipeline cycle and the second instruction during the third pipeline cycle and the third instruction during a fourth pipeline cycle, said second pipeline stage fetching an operand from a memory at the operand address provided by said first pipeline stage;

c. a third pipeline stage coupled to said second pipeline stage for executing the first instruction during the third pipeline cycle and the second instruction during the fourth pipeline cycle and the third instruction during a fifth pipeline cycle, said third pipeline stage performing a predetermined arithmetic operation on the operand provided by the second pipeline stage;

d. a delay circuit coupled to said first pipeline stage for storing the new incremented indexing address for a predetermined number of pipeline cycles, said delay circuit storing the new incremented indexing address without interrupting the normal sequential execution of the first instruction and the second instruction through the number of pipeline stages, said delay circuit comprising at least one staging means connected in parallel with at least the second pipeline stage for receiving the incremented indexing address from the first pipeline stage; and e. a wrap logic control block coupled to said first pipeline stage, said third pipeline stage and said delay circuit for providing the incremented indexing address to predetermined instructions in the first pipeline stage.

23. An instruction processor according to claim 22 wherein said first instruction aborts the execution of the second instruction if a preselected condition is satisfied.

24. An instruction processor according to claim 23 wherein said predetermined arithmetic operation of the third pipeline stage determines if the preselected condition is satisfied.

25. An instruction processor according to claim 23 wherein said wrap logic control block writes the new incremented indexing address to a memory if preselected condition is not satisfied.

26. A method of executing a number of instructions including a first instruction within a pipelined instruction processor of a data processing system wherein the pipelined instruction processor has a number of pipeline stages, the architectural state of the pipelined instruction processor being defined by at least one value stored in a memory, the first instruction being sequentially executed by respective ones of the number of pipeline stages wherein a selected one of the number of pipeline stages provides an architectural state change value to the memory during the sequential execution of the first instruction, comprising the steps of:

a. writing the architectural state change value to the memory; and b. delaying said writing step (a) from writing the architectural state change value to the memory for a predetermined time period, said delaying step delaying said writing step by staging the architectural state change value in parallel with the number of pipeline stages, said delaying step delaying said writing step without interrupting the normal sequential execution of the first instruction through the number of pipeline stages.

27. A method according to claim 26 wherein the sequential execution of the first instruction provides a fault condition after a predetermined one of the number of pipeline stages executes the first instruction.

28. A method according to claim 27 wherein said delay step delaying said writing step from writing the architectural state change value to the memory until after the first instruction is executed by the predetermined one of the number of pipeline stages.

29. A method according to claim 28 further comprising an interrupt step wherein an interrupt controller selectively provides an instruction interrupt signal to the instruction processor during the sequential execution of the first instruction.

30. A method according to claim 29 further comprising an aborting step for aborting execution of the first instruction and preventing said writing step from writing the architectural state change value to the memory if said interrupt controller provides the instruction interrupt signal.

31. A method of executing a number of instructions including a first instruction and a second instruction within a pipelined instruction processor of a data processing system wherein the pipelined instruction processor has a number of pipeline stages, both the first instruction and the second instruction being sequentially executed by respective ones of the number of pipeline stages with the first instruction entering the pipelined instruction processor first, the first instruction preventing the normal sequential execution of the second instruction upon the satisfaction of a condition, the second instruction providing a result that upon normal completion alters the state of the data processing system before the pipelined instruction processor determines if the condition of the first instruction is satisfied, comprising the steps of:

a. determining whether the condition of the first instruction is satisfied, thereby determining if the first instruction will in fact prevent the normal sequential execution of the second instruction; and b. delaying the result of the second instruction from altering the state of the data processing system until said determining step determines whether the first instruction will in fact prevent the normal sequential execution of the second instruction, said delaying step staging the result of the second instruction in parallel with the number of pipeline stages and delaying the result of the second instruction from altering the state of the data processing system without interrupting the normal sequential execution of the first instruction and the second instruction through the number of pipeline stages.

32. A method according to claim 31 wherein the number of pipeline stages includes a first stage, a second stage and a third stage wherein the first instruction is executed by the first stage during a first pipeline cycle, and is executed by the second stage during a second pipeline cycle, and is executed by the third stage during a third pipeline cycle.

33. A method according to claim 32 wherein the second instruction is executed by the first stage during the second pipeline cycle, and is executed by the second stage during the third pipeline cycle, and is executed by the third stage during a fourth pipeline cycle.

34. A method according to claim 33 wherein the second instruction provides the result during the second pipeline cycle and the determining step determines if the condition of the first instruction is satisfied during the third pipeline cycle.

35. A method according to claim 34 wherein said delaying step delays the result of the second instruction from altering the state of the data processing system until the fourth pipelined cycle.

36. A method according to claim 35 wherein the first instruction skips the execution of the second instruction upon the satisfaction of the condition.

37. A method according to claim 36 wherein the result of the second instruction is an incremented address that is provided to an indexing register within the pipelined instruction processor.

38. A method according to claim 31 wherein said delaying step includes sequentially storing the result in a number of staging registers.

39. A method according to claim 38 wherein each of the number of staging registers corresponds to a predetermined one of the number of pipeline stages.

40. A method according to claim 39 further comprising a providing step for providing the result from selected ones of the number of pipeline stages to corresponding ones of the number of staging register.

41. A method according to claim 40 wherein said providing step is performed by a wrap logic block.

42. A method of executing a number of instructions including a first instruction and a second instruction within a pipelined instruction processor of a data processing system wherein the pipelined instruction processor has a first stage and a second stage, both the first instruction and the second instruction being sequentially executed by respective ones of the first and second stages during a first pipeline cycle and a second pipeline cycle, with the first instruction entering the pipelined instruction processor first, the first instruction preventing the normal sequential execution of the second instruction upon the satisfaction of a condition, the second instruction providing a result that upon normal completion alters the state of the data processing system before the pipelined instruction processor determines if the condition of the first instruction is satisfied, comprising the steps of:

a. executing the first instruction in the first stage of the pipelined instruction processor during the first pipeline cycle;

b. moving the first instruction from the first stage of the pipelined instruction processor to the second stage of the pipelined instruction processor during the second pipeline cycle;

c. executing the first instruction in the second stage of the pipelined instruction processor and the second instruction in the first stage of the pipelined instruction processor during the second pipeline cycle;

d. determining whether the condition of the first instruction is satisfied, thereby determining if the first instruction will in fact prevent the normal sequential execution of the second instruction; and e. delaying the result of the second instruction from altering the state of the data processing system until said determining step determines whether the first instruction will in fact prevent the normal sequential execution of the second instruction, said delay step staging the result of the second instruction in parallel with the number of pipeline stages and delaying the result of the second instruction from altering the state of the data processing system without interrupting the normal sequential execution of the first instruction and the second instruction through the number of pipeline stages.

43. A method according to claim 42 further comprising the step:

f. aborting the execution of the second instruction and preventing the result of the second instruction from altering the state of the pipelined instruction processor if said determining step determines that the first instruction will in fact prevent the normal sequential execution of the second instruction.

44. In a pipelined instruction processor having a number of pipeline stages for sequentially executing a number of instructions including a selected instruction, wherein execution of the selected instruction by at least one of the number of pipeline stages provides an architectural state change to the pipelined instruction processor, the improvement comprising:

a delay circuit coupled to the pipelined instruction processor for delaying the architectural state change for a predetermined time period without interrupting the execution of the instruction processor, said delay circuit comprises a number of staging registers that are in parallel with the pipeline stages.

45. A method of sequentially executing a number of instructions including a selected instruction within a pipelined instruction processor having a number of pipeline stages, wherein execution of the selected instruction by at least one of the number of pipeline stages provides an architectural state change to the pipelined instruction processor, the method comprising the steps of:

delaying the architectural state change for a predetermined time period, said delaying step staging the architectural state change in parallel with the number of pipeline stages; and continuing to sequentially execute a number of subsequent instructions while said delaying step delays the architectural state change.

* * * * *